United States Patent
Matsubara et al.

(10) Patent No.: US 10,354,693 B2
(45) Date of Patent: Jul. 16, 2019

(54) INFORMATION PROCESSING APPARATUS, DISTRIBUTION APPARATUS, PLAYBACK METHOD, AND NON-TRANSITORY COMPUTER READABLE STORAGE MEDIUM

(71) Applicant: YAHOO JAPAN CORPORATION, Tokyo (JP)

(72) Inventors: Ai Matsubara, Tokyo (JP); Kenichi Kuromusha, Tokyo (JP); Yoshihito Nishikawa, Tokyo (JP); Yoshio Ikai, Tokyo (JP); Kazutaka Kimura, Tokyo (JP); Kanta Suzuki, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 272 days.

(21) Appl. No.: 14/839,392

(22) Filed: Aug. 28, 2015

(65) Prior Publication Data
US 2016/0065888 A1    Mar. 3, 2016

(30) Foreign Application Priority Data
Sep. 1, 2014    (JP) .................................. 2014-177536

(51) Int. Cl.
| | |
|---|---|
| *H04N 5/92* | (2006.01) |
| *G11B 27/34* | (2006.01) |
| *G11B 27/10* | (2006.01) |
| *H04N 9/82* | (2006.01) |

(52) U.S. Cl.
CPC ............ *G11B 27/34* (2013.01); *G11B 27/102* (2013.01); *H04N 9/8211* (2013.01)

(58) Field of Classification Search
CPC ...... G11B 27/102; G11B 27/34; H04N 9/8211

USPC ............... 386/248, 241; 455/3.06; 700/94; 348/725; 725/131, 151; 715/727; 381/107
See application file for complete search history.

(56) References Cited

U.S. PATENT DOCUMENTS

| | | | |
|---|---|---|---|
| 9,020,327 B2 * | 4/2015 | Candelore | H04N 5/76 386/249 |
| 2002/0143978 A1 * | 10/2002 | Kuramochi | G06F 17/30017 709/231 |
| 2003/0059198 A1 * | 3/2003 | Yagura | H04N 1/00129 386/355 |

(Continued)

FOREIGN PATENT DOCUMENTS

| | | |
|---|---|---|
| JP | 2001103047 A | 4/2001 |
| JP | 2001196959 A | 7/2001 |

(Continued)

OTHER PUBLICATIONS

Feb. 9, 2016 Office Action issued in Japanese Patent Application No. 2014-177536.

(Continued)

*Primary Examiner* — Thai Q Tran
*Assistant Examiner* — Stephen R Smith
(74) *Attorney, Agent, or Firm* — Oliff PLC

(57) ABSTRACT

An information processing apparatus includes a determination unit configured to determine a playback mode of sound included in content. The information processing apparatus includes a playback unit configured to play back the sound included in the content in the playback mode determined by the determination unit, at playback of the content.

21 Claims, 9 Drawing Sheets

(56) References Cited

U.S. PATENT DOCUMENTS

| | | | |
|---|---|---|---|
| 2005/0069154 A1* | 3/2005 | Yamazaki | G06F 3/165 381/104 |
| 2009/0064267 A1* | 3/2009 | Lee | H04N 21/435 725/149 |
| 2009/0197524 A1* | 8/2009 | Haff | H04L 12/2827 455/3.06 |
| 2010/0011405 A1* | 1/2010 | Wu | H04N 7/163 725/131 |
| 2011/0019102 A1* | 1/2011 | Katsuya | G11B 27/002 348/725 |
| 2011/0142413 A1* | 6/2011 | Kang | A61B 5/165 386/234 |
| 2012/0177225 A1* | 7/2012 | Springfield | H03G 3/34 381/107 |
| 2012/0224043 A1* | 9/2012 | Tsurumi | H04N 21/4223 348/78 |
| 2014/0115479 A1* | 4/2014 | Wang | H04L 67/322 715/727 |
| 2014/0281911 A1* | 9/2014 | Kim | G06F 17/30899 715/234 |
| 2016/0066036 A1* | 3/2016 | Felt | H04N 21/4542 386/241 |

FOREIGN PATENT DOCUMENTS

| | | | |
|---|---|---|---|
| JP | 2002297157 A | | 10/2002 |
| JP | 2003134419 A | | 5/2003 |
| JP | 2004-062121 A | | 2/2004 |
| JP | 3122865 U | | 6/2006 |
| JP | 2006243397 A | | 9/2006 |
| JP | 2009223431 A | | 10/2009 |
| JP | 2011128204 A | * | 6/2011 |
| JP | 2012186622 A | | 9/2012 |
| JP | 2014-110453 A | | 6/2014 |
| WO | 2009/118894 A1 | | 10/2009 |

OTHER PUBLICATIONS

Jul. 26, 2016 Office Action issued in Japanese Patent Application No. 2014-177536.

* cited by examiner

| ADVER-TISER ID | ADVERTISING CONTENT | NUMBER OF IMPRESSIONS | GUARANTEED NUMBER OF IMPRESSIONS | VALUE | ... |
|---|---|---|---|---|---|
| B10 | C20, PLAYBACK CONTROL INSTRUCTION | 10000 | 20000 | aaa | ... |
| | C30, PLAYBACK CONTROL INSTRUCTION | 5000 | 10000 | bbb | ... |
| | C40, PLAYBACK CONTROL INSTRUCTION | 15000 | 20000 | ccc | ... |
| | ... | ... | ... | ... | ... |
| B20 | C50, PLAYBACK CONTROL INSTRUCTION | 10000 | 20000 | ddd | ... |
| | C60, PLAYBACK CONTROL INSTRUCTION | 5000 | 10000 | eee | ... |
| | ... | ... | ... | ... | ... |
| ... | ... | ... | ... | ... | ... |

FIG.8
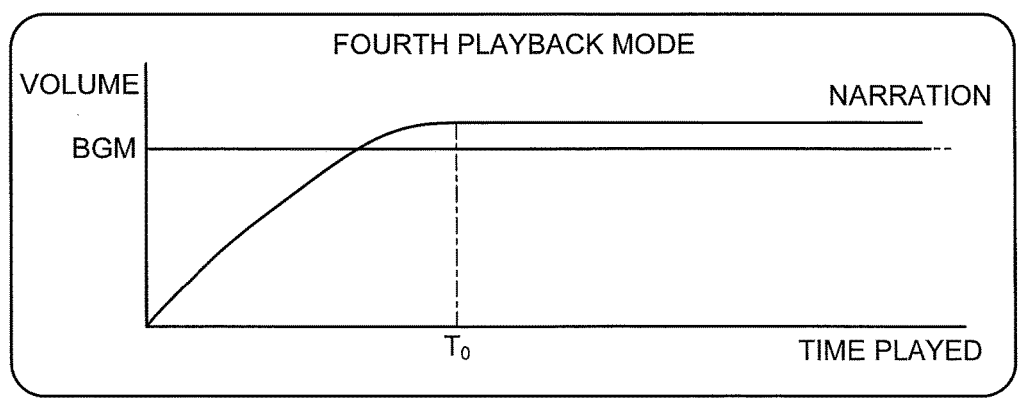
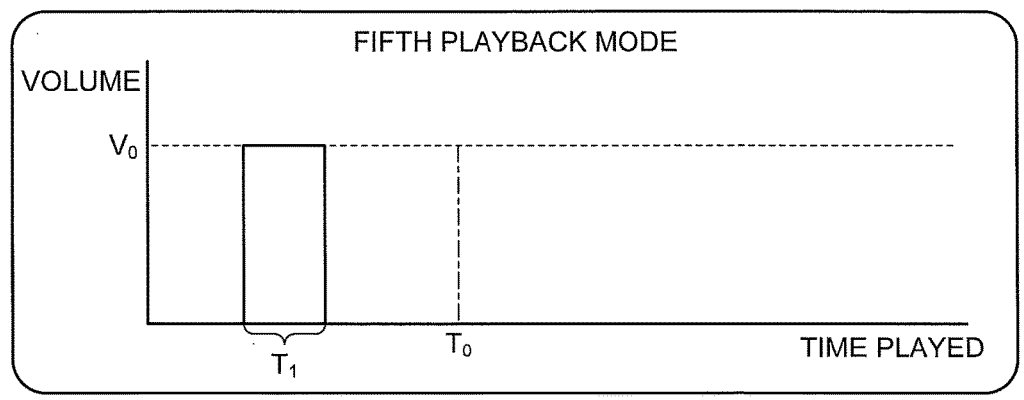

INFORMATION PROCESSING APPARATUS, DISTRIBUTION APPARATUS, PLAYBACK METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2014-177536 filed in Japan on Sep. 1, 2014.

BACKGROUND OF THE INVENTION

1. Field of the Invention

The present invention relates to an information processing apparatus, a distribution apparatus, a playback method, and a non-transitory computer readable storage medium.

2. Description of the Related Art

In recent years, information has been distributed actively through the Internet. As an example of such information distribution, a technology is known which, for the purpose of branding with sound, transmits sound such as a sound logo related to a company, product, or the like, and a moving image with sound, as advertising content, to a terminal apparatus of a user to cause the terminal apparatus to display a web page and also play back the sound and the moving image. Moreover, also known are, for example, a technology for playing back sound only if the line of sight of a user is directed to the terminal apparatus when the content is played back, and a technology for adjusting the volume in accordance with ambient noise.

Patent Literature 1: Japanese Patent Application Laid-open No. 2014-110453

Patent Literature 2: Japanese Patent Application Laid-open No. 2004-062121

However, in the above known technologies, sound may be played back in an inappropriate mode. For example, the above known technologies simply play back the content at a predetermined volume level when the line of sight of the user is directed to the terminal apparatus. Accordingly, the sound may be played back in a space where the user is not intended, such as on a train.

SUMMARY OF THE INVENTION

It is an object of the present invention to at least partially solve the problems in the conventional technology.

According to one aspect of an embodiment, an information processing apparatus includes a determination unit configured to determine a playback mode of sound included in content. The information processing apparatus includes a playback unit configured to play back the sound included in the content in the playback mode determined by the determination unit, at playback of the content.

According to the other aspect of an embodiment, a distribution apparatus includes a distribution unit configured to distribute control information to an information processing apparatus for playing back content including sound. The control information causes the information processing apparatus to execute, a determination procedure for determining a playback mode of the sound at start of the playback of the content, and a playback procedure for, upon starting the playback of the content, playing back the sound included in the content in the playback mode determined by the determination procedure.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram for explaining other examples of sound modes to be determined by a determination unit according to an embodiment;

DETAILED DESCRIPTION OF THE PREFERRED EMBODIMENTS

Figure 1:
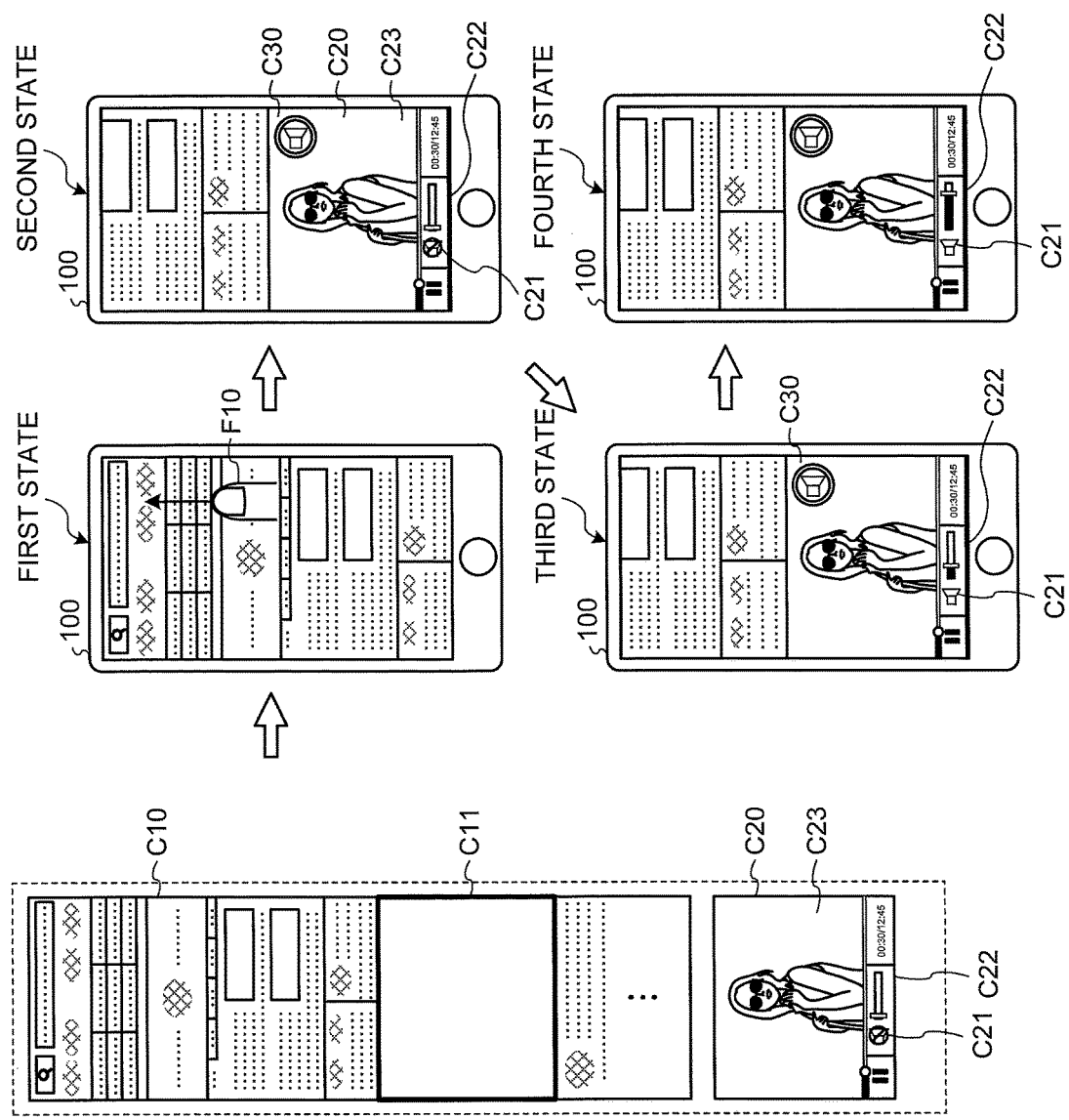
FIG. 1 is a diagram illustrating an example of a terminal apparatus according to an embodiment.

Hereinafter, modes for carrying out an information processing apparatus, a distribution apparatus, a playback method, and a playback program according to the present application (hereinafter referred to as the "embodiments") are described in detail with reference to the drawings. The information processing apparatus, the distribution apparatus, the playback method, and the playback program according to the present application are not limited by the embodiments. Moreover, in the following embodiments, the same reference numerals are assigned to the same portions, and their overlapping descriptions are omitted.

1. An Example of the Terminal Apparatus 100

Firstly, a description is given of an example of a process to be executed by a terminal apparatus 100 being an example of the information processing apparatus, with reference to FIG. 1. FIG. 1 is a diagram illustrating an example of a terminal apparatus according to an embodiment. FIG. 1 illustrates an example where the terminal apparatus 100 displays a web page C10 and content C20.

The terminal apparatus 100 illustrated in FIG. 1 is a smart device such as a smartphone or tablet. The terminal apparatus 100 is a mobile terminal apparatus that can communicate with any server apparatus via a wireless communication network such as 3G (Generation) or LTE (Long Term Evolution). Moreover, the terminal apparatus 100 includes an output unit 130 including a liquid crystal display, as described below. A touchscreen is assumed to be adopted for the terminal apparatus 100. In other words, a user of the terminal apparatus 100 touches a display surface of the output unit 130 (hereinafter may be described as the screen) with a finger or dedicated pen to perform various operations.

The web page C10 is a web page where, for example, news, weather forecast, indexes and content of incoming mails, Photo Viewer, and other various content are placed, and is a web page described in HTML (Hyper Text Markup Language), XML (Extensible Markup Language), or the like. Such a web page C10 includes an input field for inputting search keywords, and links to other web pages. In the following description, the web page C10 is assumed to be a web page of what is called a web portal. Moreover, the web page C10 is assumed to be a web page optimized for smart devices, and to be a web page having the same horizontal display size as that of the screen of the terminal apparatus 100. Moreover, the web page C10 is also assumed to be a web page having a vertical display size longer than that of the output unit 130 of the terminal apparatus 100.

The web page C10 may contain content where the content are arranged like independent tiles, and each of the content arranged like tiles can be, for example, operated or updated. Here, the size and arrangement position of each tile arranged in the web page C10 may be updated automatically on a tile by tile basis, and changed in accordance with the user's operation.

For example, news topics are displayed on the web page C10 in itemized form under displays such as "latest news" and "news list." Such a news topic corresponds to an anchor text (anchor text) linked to another web page. Moreover, texts and buttons, where links to web pages that offer various services such as "route", "auction", and "shopping" are set, are arranged in the web page C10. Moreover, in the example illustrated in FIG. 1, the web page C10 includes an advertising area C11 for arranging the content C20.

The content C20 is, for example, a moving image including sound, and is advertising content provided by an advertiser. In the example illustrated in FIG. 1, the content C20 is content including a moving image where a woman is shown, and predetermined sound, and is content that plays back the sound together with the moving image when played back.

Moreover, in the example illustrated in FIG. 1, the content C20 includes an icon C21 indicating a sound playback state, a volume bar C22 for adjusting sound, and a moving image C23. For example, the terminal apparatus 20 displays the icon C21 indicating the sound playback state when playing back the content C20. Moreover, when the user operates the volume bar C22, the terminal apparatus 100 changes the volume for the time the sound is played back in accordance with the operation content, and also changes the icon C21.

The content C20 is not limited to the form illustrated in FIG. 1. For example, the content C20 is assumed to be, not only the advertisement, but also volunteer recruitment, a public advertisement, a notice to the public, and any other content. In other words, characters, figures, symbols, hyperlinks, and any other content can be applied as long as the content is for attracting the user's interest and widely notifying information included in such content, or information included in content (for example, a landing page) related to such content.

Moreover, the content C20 is simply required to include sound, and may be, for example, simple audio content. Moreover, the content C20 may include any sound that recalls a company, advertising target product, or service, such as a sound trademark, that is, a sound logo. Moreover, the content C20 may include speech sound created by a human or sound synthesis technique, that is, a narration. Moreover, the content C20 may include background sound that modifies or assists other sounds, such as BGM, and a sound effect that is output upon the user's operation or brightening the content. Moreover, the content C20 is not limited to the moving image including sound. Any content including sound, for example, a combination of sound and a still image, any content including sound such as a game, and concert video, are applicable.

Moreover, a link to a predetermined web page (what is called a landing page) may be set in the content C20. For example, the terminal apparatus 100 displays the landing page set in the content C20 when a predetermined condition is satisfied by the user's operation. Specifically, the terminal apparatus 100 displays the landing page corresponding to the content C20 when the user has selected an area, where the content C20 is displayed, of the screen of the terminal apparatus 100.

2. Processes to be Executed by the Terminal Apparatus 100

Here, the known terminal apparatus 100 plays back sound in accordance with the volume preset by the user when playing back content including sound, such as a moving image or audio content. For example, the terminal apparatus 100 detects the line of sight of the user by an image analysis or the like, and plays back the sound at a volume level preset by the user only when the line of sight of the user is directed within the screen. Moreover, the terminal apparatus 100 plays back the sound at a predetermined volume level when ambient noise is larger than a predetermined threshold value.

However, in the above-mentioned known technologies, an inappropriate action may lead to the playback of sound. For example, if the user has not set the volume to a mute state in the known technologies, sound may be output on a train, in a public place, and the like. Moreover, in a terminal apparatus that sets a volume level for incoming calls and a volume level for playing back content individually, sound may be output upon the playback of the content even if the user has set the volume level for incoming calls or the like to the mute state.

Moreover, technologies are becoming widespread: a technology for automatically starting playing back video content including sound when the video content is placed on a web page and is shown within the screen, and a technology for playing back sound simultaneously with the display of a web page. In the known technologies, an event where sound is played back by an inappropriate action is predicted to increase.

Hence, the terminal apparatus 100 performs the following processes. Firstly, the terminal apparatus 100 executes a determination process for determining a playback mode of sound included in content. Specifically, the terminal apparatus 100 determines that sound is played back in a mode of gradually increasing the volume from the mute state to a predetermined volume level (for example, a volume preset by the user) (hereinafter described as a fade-in) before a predetermined time passes since the start of the playback.

The terminal apparatus 100 then executes a playback process for playing back the content in a predetermined manner when the sound included in the content is played back. For example, when playing back the content C20 automatically or by the user's operation, the terminal apparatus 100 fades in the sound while playing back the moving image C23. As a result, when the playback of the sound is inappropriate, the user can take actions such as stopping the playback of the content C20, and setting the volume to the mute state, before the volume reaches the predetermined volume level. As a result, the terminal apparatus 100 can prevent the output of the sound in an inappropriate mode such as a sudden output of the sound on a train or the like.

The terminal apparatus 100 can perform the determination process at any timing as long as determining a playback mode before the playback of the content. For example, in cases such as of having received content including sound, of having received a web page where content including sound is placed, and of including sound in an advertisement placed in a web page, the terminal apparatus 100 is simply required to perform the determination process at any timing before the playback of the content including the sound. Moreover, the terminal apparatus 100 is simply required to determine a playback mode of playing back sound at a predetermined volume level when sound is not, for example, faded in and played back at the predetermined volume level.

Such a determination process may be performed on all content including sound. Alternatively, whether or not the determination process is performed may be preset for each content. Moreover, the terminal apparatus 100 may performed the determination process in accordance with the type of content. For example, the terminal apparatus 100 may perform the determination process only on advertising content of a process designated by an advertiser. Moreover, the terminal apparatus 100 may perform the determination process in accordance with a physical state of the terminal apparatus. For example, when earphones are inserted or when sound is already being played back by a music playback application or video playback application, the terminal apparatus 100 may determine the playback mode of outputting sound at a predetermined volume level without a fade-in.

2-1. Examples of the Processes to be Executed by the Terminal Apparatus 100

Hereinafter, examples of the determination and playback processes to be executed by the terminal apparatus 100 are described with reference to FIG. 1. In the following description, the description is given by dividing the examples of the determination and playback processes to be executed by the terminal apparatus 100 into a first state to a fourth state.

Firstly, the terminal apparatus 100 receives the web page C10 and the content C20. In such a case, the terminal apparatus 100 determines whether or not sound is included in the content C20 and, when sound is included in the content C20, executes the determination process. For example, when the content C20 is a moving image including sound, the terminal apparatus 100 determines a playback mode of fading in the sound of the content C20.

Next, the terminal apparatus 100 places the content C20 in the advertising area C11 of the web page C10. As illustrated in the first state, the terminal apparatus 100 displays the web page C10. In the example illustrated in the first state, the advertising area C11 is placed outside the screen of the terminal apparatus 100. Accordingly, the terminal apparatus 100 does not display the content C20.

Next, when having accepted a scroll operation for scrolling the web page C10 upward with a finger F10 of the user, the terminal apparatus 100 scrolls the web page C10 and the content C20 upward. In other words, the terminal apparatus 100 moves the display position of the content C20 in such a manner as to superimpose the content C20 on the advertising area C11 of the web page C10.

As a result, the terminal apparatus 100 displays the content C20 within the screen as illustrated in the second state. Moreover, when a predetermined area of the content C20 is displayed within the screen, the terminal apparatus 100 starts playing back the content C20 automatically in the playback mode determined by the determination process. For example, if 60% of the display area of the content C20 is displayed within the screen by the user's scroll operation, the terminal apparatus 100 starts playing back the content C20.

As a result, as illustrated in the second to fourth states, the terminal apparatus 100 starts playing back the moving image C23 of the content C20 and also fades in the sound of the content C20. For example, as illustrated in the second state, the terminal apparatus 100 plays back the content C20 in the mute state immediately after the playback. Moreover, as illustrated in the second state, the terminal apparatus 100 displays the icon C21 indicating the mute state, and also sets the volume bar C22 in the mute state position.

Moreover, the terminal apparatus 100 increases the volume with a fade-in and also gradually moves the volume bar C22 in synchronization with the volume level while displaying the icon C21 indicating the output of the sound as illustrated in the third state. The terminal apparatus 100 further increases the volume with the fade-in, and also moves the volume bar C22 in synchronization with the volume level as illustrated in the fourth state. In this manner, the terminal apparatus 100 fades in the sound of the content C20 when playing back the content C20. Hence, the terminal apparatus 100 can prevent the output of the sound in such an inappropriate mode as that the sound is suddenly output at a predetermined volume level.

When the user, who became aware that the sound is being output, has performed an operation to adjust the volume in the middle of the second to fourth states, the terminal apparatus 100 stops the fade-in and adjusts the volume in accordance with the user's operation. For example, when the user has selected the icon C21 in the third state, the terminal apparatus 100 sets the sound to the mute state while continuing the playback of the moving image C23. Moreover, the terminal apparatus 100 displays the icon C21 indicating the mute state and also sets the volume bar C22 in the mute state position.

Moreover, when the user has operated the volume bar C22 in the third state, or has operated the volume operation with a physical operation button or the like of the terminal apparatus 100, the terminal apparatus 100 stops the fade-in and adjusts the volume in accordance with the user's operation. For example, when the user has slid the volume bar C22 in the third state, the terminal apparatus 100 outputs the sound at a volume level in accordance with the position after the slide.

Furthermore, the terminal apparatus 100 may display a display indicating that sound is being played back in the playback mode determined by the determination process, that is, an attention display C30, superimposing it on the content C20. For example, the terminal apparatus 100 displays the attention display C30 when the sound is being faded in in the second to fourth states. When the attention display C30 has been selected, the terminal apparatus 100 may stop the fade-in and set the volume to the mute state. In another example, when the attention display C30 has been selected, the terminal apparatus 100 may stop the fade-in and output the sound at a volume level preset by the user's operation or the like.

2-2. Regarding the Determination Process after a Pause

After pausing the playback of the content C20, the terminal apparatus 100 may play back the sound again in a playback mode determined by the determination process, or start playing back the sound in accordance with a playback mode of when the playback was paused. For example, when an operation for pausing the playback of the content C20 has been performed, or when a predetermined area of the content C20 has moved to the outside of the screen, the terminal apparatus 100 pauses the playback of the content C20.

In such a case, the terminal apparatus 100 re-executes the determination process in accordance with the type of the content C20, time played, setting, and the like. For example, the terminal apparatus 100 newly determines a playback mode of fading in when the time played before the pause is shorter than a predetermined threshold value, and newly determines a playback mode of playing back at a currently set volume level when the time played before the pause is longer than the predetermined threshold value. When the fade-in is not complete before the pause, the terminal apparatus 100 may newly determine such a playback mode as to execute the fade-in until the end upon playback.

The terminal apparatus 100 fades in the sound upon the playback of the content C20 when having newly determined the playback mode of fading in, and plays back the sound at a predetermined volume level upon the playback of the content C20 when having newly determined the playback mode of playing back sound without a fade-in. Moreover, when having determined the playback mode of executing a fade-in until the end upon playback, the terminal apparatus 100 may resume the fade-in stopped simultaneously with the pause of the content C20 at the playback of the content C20 to gradually increase the volume level to a predetermined volume level.

In this manner, the terminal apparatus 100 predetermines a playback mode of playing back sound of content. When playing back the content, then the terminal apparatus 100 plays back the sound in a predetermined playback mode. As a result, the terminal apparatus 100 can make the user aware that the sound of the content is to be output. As a result, in cases such as where the output of the sound is inappropriate, the terminal apparatus 100 can let the user perform operations such as setting the mute state, and accordingly can prevent the output of the sound in an inappropriate mode.

2-3. Regarding the Entity of Execution

The terminal apparatus 100 can achieve the above-mentioned processes in any method although the description is omitted in the above description. For example, the terminal apparatus 100 may achieve the above-mentioned processes by downloading in advance an application to cause the terminal apparatus 100 to display the web page C10 and execute the above-mentioned determination and playback processes and executing the application at a given timing. Moreover, the terminal apparatus 100 accepts the distribution of control information that causes the above-mentioned determination and playback processes to be executed simultaneously with the distribution of the web page C10 and the content C20. The terminal apparatus 100 then executes the above determination and playback processes in accordance with the control information. A description is given hereinafter of the terminal apparatus 100 and the like that execute the above-mentioned determination and playback processes in accordance with such control information. Moreover, in the following description, the description is given assuming that the content C20 is an example of advertising content being content related to an advertisement.

3. The Configuration of an Advertising Distribution System

Figure 2:
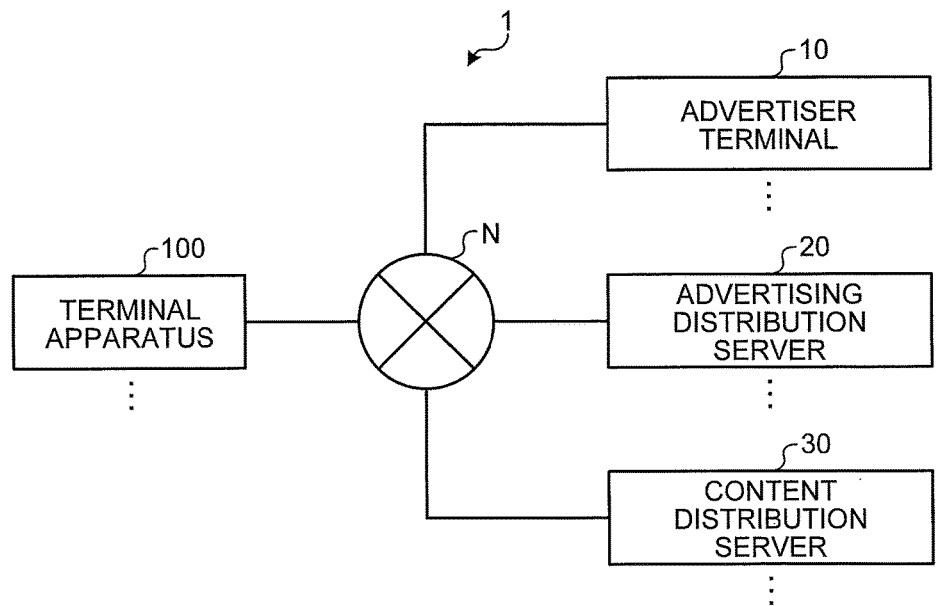
FIG. 2 is a diagram illustrating a configuration example of an advertising distribution system according to an embodiment.

The terminal apparatus 100 and the like that achieve the above display process are described below. Firstly, a description is given of the configuration of an advertising distribution system 1 according to an embodiment with reference to FIG. 2. FIG. 2 is a diagram illustrating a configuration example of an advertising distribution system according to an embodiment. As illustrated in FIG. 2, the advertising distribution system 1 includes the terminal apparatus 100, an advertiser terminal 10, an advertising distribution server 20, and a content distribution server 30. The terminal apparatus 100, the advertiser terminal 10, the advertising distribution server 20, and the content distribution server 30 are communicably connected via a network N in a wired or wireless manner. The advertising distribution system 1 illustrated in FIG. 2 may include a plurality of the terminal apparatuses 100, a plurality of the advertiser terminals 10, a plurality of the advertising distribution servers 20, and a plurality of the content distribution servers 30.

The terminal apparatus 100 is an information processing apparatus used by a user who views web pages. For example, the terminal apparatus 100 is a mobile phone such as a smartphone, a tablet terminal, a PDA (Personal Digital Assistant), a desktop PC (Personal Computer), a note PC, or the like. The terminal apparatus 100 acquires the web page C10 from the content distribution server 30 in accordance with the user's operation, and displays the acquired web page C10. Moreover, when an advertisement acquisition command described below, together with the web page C10, is included, the terminal apparatus 100 acquires the content C20 from the advertising distribution server 20, and displays the acquired content C20 together with the web page C10.

The advertiser terminal 10 is an information processing apparatus used by an advertiser. For example, the advertiser terminal 10 is a desktop PC, a note PC, a tablet terminal, a mobile phone, a PDA, or the like. The advertiser terminal 10 submits the content C20 to the advertising distribution server 20 in accordance with the advertiser's operation. For example, the advertiser terminal 10 submits a still image, a moving image, text data, a URL (Uniform Resource Locator) for acquiring content (for example, a landing page) corresponding to the content C20, and the like, as the content C20, to the advertising distribution server 20.

The advertiser may request an agency to submit advertising content. In this case, who submits the advertising content to the advertising distribution server 20 is the agency. In the following description, it is assumed that the expression "advertiser" is a concept including not only the advertiser but also the agency, and the expression "advertiser terminal" is a concept including not only the advertiser terminal 10 but also the agency's apparatus used by the agency.

The advertising distribution server 20 is a server apparatus that distributes advertising content submitted from the advertiser terminal 10. For example, when having accepted access from the terminal apparatus 100, the advertising distribution server 20 performs matching on advertising content based on the location of the terminal apparatus 100, the attribute of the user, and the like, and distributes, to the terminal apparatus 100, advertising content being the resultant distribution target. Moreover, the advertising distribution server 20 distributes control information together with the advertising content to the terminal apparatus 100. The control information is described in script languages such as JavaScript (registered trademark) and CSS (Cascading Style Sheets).

The content distribution server 30 is, for example, a web server that distributes the web page C10 to the terminal apparatus 100. For example, the content distribution server 30 distributes, to the terminal apparatus 100, the web page C10 being a web portal where various pieces of information related to a web portal, news site, auction site, weather forecast site, shopping site, finance (stock price) site, route search site, map providing site, travel site, restaurant introduction site, web blog, and the like are arranged. The content distribution server 30 may be a server that transmits, to the terminal apparatus 100, a web page where various pieces of information are arranged like tiles, and information is updated on a tile by tile basis.

Here, the web page C10 to be distributed by the content distribution server 30 includes an advertisement acquisition command. For example, a URL of the advertising distribution server 20 or the like is described as the advertisement acquisition command in an HTML file or the like forming the web page C10. In this case, the terminal apparatus 100 accesses the URL described in the HTML file or the like to acquire the content C20 from the advertising distribution server 20.

Various data to be distributed from the content distribution server 30 to the terminal apparatus 100 are, in reality, an HTML file forming a web page, an image, a moving image superimposed on the web page for display, and the like. However, various data to be distributed from the content distribution server 30 to the terminal apparatus 100 may be expressed below as content.

4. The Configuration of the Advertising Distribution Server

Figure 3:
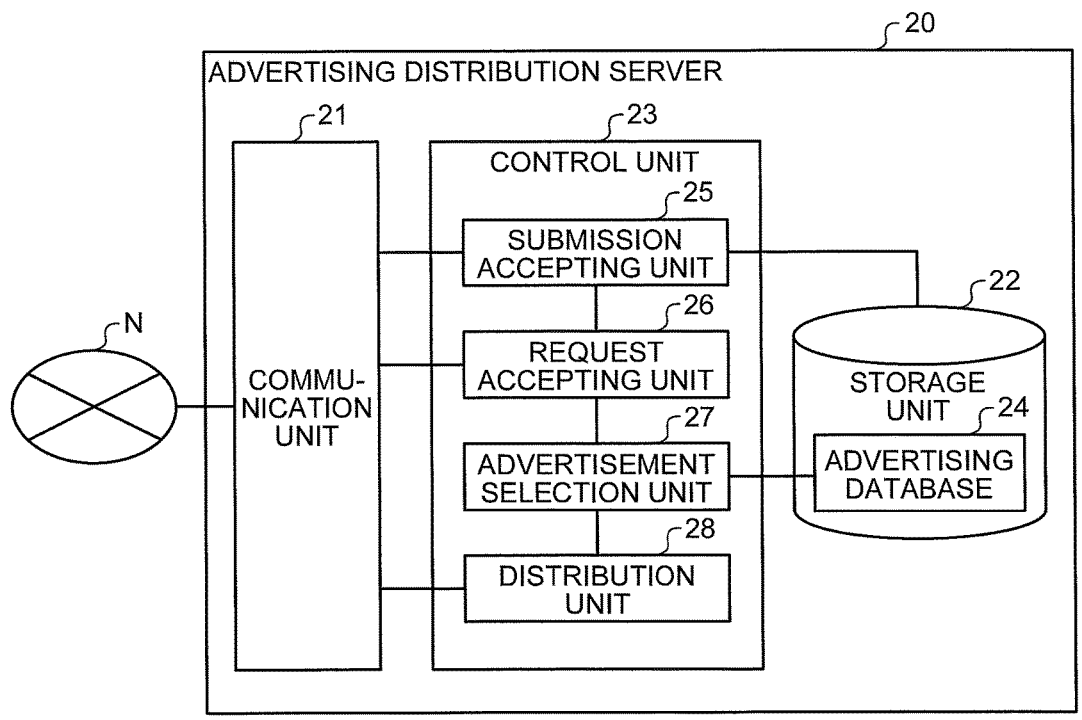
FIG. 3 is a diagram illustrating a configuration example of an advertising distribution server according to an embodiment.

Next, the configuration of the advertising distribution server 20 according to an embodiment is described with reference to FIG. 3. FIG. 3 is a diagram illustrating a configuration example of the advertising distribution server according to an embodiment. As illustrated in FIG. 3, the advertising distribution server 20 includes a communication unit 21, a storage unit 22, and a control unit 23.

The communication unit 21 is realized by, for example, an NIC (Network Interface Card). The communication unit 21 is connected to the network N in a wired or wireless manner, and transmits/receives information to/from the terminal apparatus 100, the advertiser terminal 10, and the content distribution server 30.

The storage unit 22 is realized by, for example, RAM (Random Access Memory), a semiconductor memory device such as flash memory (Flash Memory), or a storage device such as a hard disk or optical disc. Moreover, an advertising database 24, which is a database where various pieces of information related to advertising content submitted from the advertiser terminal 10 are stored, is stored in the storage unit 22.

Figures 4, 5:
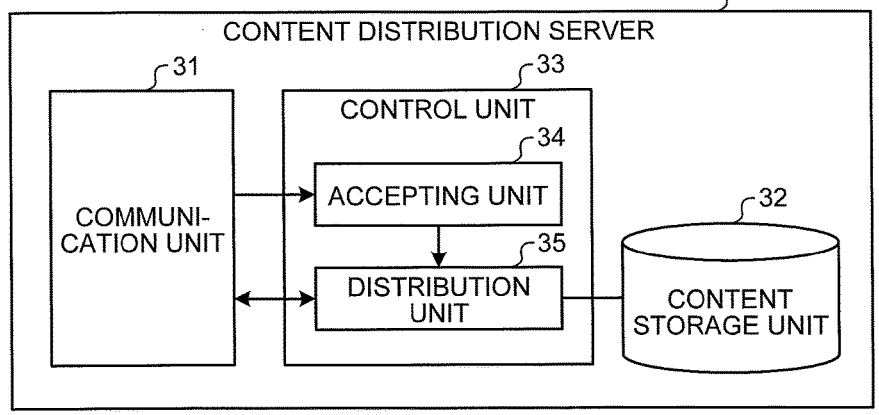
FIG. 4 is a diagram illustrating an example of information stored in an advertising database according to an embodiment.
FIG. 5 is a diagram illustrating a configuration example of a content distribution server according to an embodiment.

Here, FIG. 4 is a diagram illustrating an example of information stored in an advertising database according to an embodiment. In the example illustrated in FIG. 4, the advertising database 24 includes items such as advertiser ID, advertising content, number of impressions, guaranteed number of impressions, and value. Information for matching content with users, and information such as the CTR (Click Through Rate) may be further stored in the advertising database 24.

"Advertiser ID" indicates identification information for identifying the advertiser or advertiser terminal 10. "Advertising content" indicates content submitted from the advertiser terminal 10, that is, content related to an advertisement. FIG. 4 illustrates the example where conceptual pieces of information such as "C20" to "C60" are stored in the "advertising content." However, for example, any content including sound such as a moving image including sound, sound and an image, sound and text data, and a game style advertisement including sound, and a URL where such content exists, or file path names indicating their storage locations are actually stored.

"Number of impressions" indicates the number of times the advertising content is displayed. Moreover, "guaranteed number of impressions" indicates the number of times the advertising content is displayed for which the value is guaranteed. Moreover, "value" indicates a fee to be paid by the advertiser for the display of the advertising content by the "number of guaranteed impresses." In other words, advertising distribution server 20 is a server that distributes content related to an advertisement in an impression guaranteed form.

In other words, FIG. 4 illustrates an example where an advertiser identified with an advertiser ID "B10" has submitted the content items C20 to C40. Moreover, FIG. 4 illustrates an example where the number of impressions of the content "C20" is "10000", the guaranteed number of impressions is "20000", and the amount charged for the display of the content "C20" by the guaranteed number of impressions is "aaa".

Here, a playback control instruction to instruct in what playback mode each content is played back as advertising content upon playback is registered in the advertising database 24. For example, the playback control instruction is assumed to include a position to place the content C20, a condition to start the playback of the content C20, a condition of whether or not the control of volume is executed by the above-mentioned determination and control processes when the content C20 is played back, an instruction about a playback mode for playback, an instruction indicating a playback mode to be determined depending on the state, and information such as a URL of a landing page.

When content related to an advertisement is distributed in a pay-per-click billing model that charges each time for the selection of the advertising content, the number of times the content is selected, the amount charged for the selection of the content, and the like are registered in the advertising database 24. Moreover, when a distribution request has been received, if the advertising content is selected through bidding, and the selected advertising content is distributed, a bid price, which is an advertising fee set by the advertiser as a fee per impression, the CTR, the like are registered in the advertising database 24.

Return to FIG. 3 to continue the description. The control unit 23 is realized by, for example, a CPU (Central Processing Unit) or MPU (Micro Processing Unit) executing various programs stored in a storage device in the advertising distribution server 20, using RAM as a working area. Moreover, the control unit 23 is realized by an integrated circuit such as an ASIC (Application Specific Integrated Circuit) or FPGA (Field Programmable Gate Array).

As illustrated in FIG. 3, the control unit 23 includes a submission accepting unit 25, a request accepting unit 26, an advertisement selection unit 27, and a distribution unit 28, and achieves or executes the function and operation of information processing described below. The internal configuration of the control unit 23 is not limited to the configuration illustrated in FIG. 3, and may be another configuration as long as it is a configuration to perform information processing described below. Moreover, a connection relationship between the processing units of the control unit 23 is not limited to the connection relationship illustrated in FIG. 3, and may be another connection relationship.

The submission accepting unit 25 accepts the submission of advertising content from the advertiser terminal 10. Specifically, the submission accepting unit 25 accepts the submission of the advertising content. Moreover, the submission accepting unit 25 accepts the content C20 and a playback control instruction. In such a case, the submission accepting unit 25 registers the content C20 and the playback control instruction, together with the advertiser ID, in the advertising database 24.

The request accepting unit 26 accepts an advertising content acquisition request from the terminal apparatus 100. For example, the request accepting unit 26 accepts an HTTP request as the advertising content acquisition request.

The advertisement selection unit 27 selects advertising content being a candidate for distribution from the advertising database 24 when the request accepting unit 26 has accepted the advertising content acquisition request. For example, the advertisement selection unit 27 performs matching on the advertising content being a distribution target among the advertising content registered in the advertising database 24, based on the location of the terminal apparatus 100 and the attribute of the user. In such matching, advertising content is selected in such a manner as that the number of impressions is larger than the guaranteed number of impressions. For example, the advertisement selection unit 27 preferentially selects advertising content having the largest difference between the guaranteed number of impressions and the number of impressions. The advertisement selection unit 27 may preferentially select advertising content having a high bid price or CTR, or advertising content having both of a high bid price and CTR. The advertisement selection unit 27 then outputs the advertising content selected as the distribution target to the distribution unit 28.

If the web page is a search page, the advertisement selection unit 27 may use an advertising distribution method called search advertising that extracts advertising content that matches search keywords designated by the search page. Moreover, the advertisement selection unit 27 may use an advertising distribution method called targeted distribution that extracts advertising content that matches attribute information (a psychographic attribute, demographic attribute, and the like) of the user.

The distribution unit 28 distributes the control information, together with the advertising content selected by the advertisement selection unit 27, to the terminal apparatus 100. Specifically, when having received the advertising content selected by the advertisement selection unit 27, the distribution unit 28 extracts a playback control instruction included in the received advertising content. The distribution unit 28 then generates control information for causing the terminal apparatus 100 to execute the determination and playback processes with content indicated by the extracted playback control instruction. The distribution unit 28 distributes the generated control information and the advertising content afterward to the terminal apparatus 100.

5. The Configuration of the Content Distribution Server 30

Next, the configuration of the content distribution server 30 according to an embodiment is described with reference to FIG. 5. FIG. 5 is a diagram illustrating a configuration example of a content distribution server according to an embodiment. As illustrated in FIG. 5, the content distribution server 30 includes a communication unit 31, a content storage unit 32, and a control unit 33.

The communication unit 31 is realized by, for example, an NIC. The communication unit 31 is connected to the network N in a wired or wireless manner, and transmits/receives information to/from the terminal apparatus 100 and the advertising distribution server 20.

The content storage unit 32 is realized by, for example, a semiconductor memory device such as RAM or flash memory, or a storage device such as a hard disk or optical disc. A web page being an example of content is stored in the content storage unit 32. For example, an HTML file forming a web page and a still and a moving image displayed on the web page are stored in the content storage unit 32.

The control unit 33 is realized by, for example, a CPU or MPU executing various programs (corresponding to an example of a distribution program) stored in a storage device in the content distribution server 30, using RAM as a working area. Moreover, the control unit 33 is realized by an integrated circuit such as an ASIC or FPGA.

As illustrated in FIG. 5, the control unit 33 includes an accepting unit 34 and a distribution unit 35, and achieves or executes the function and operation of information processing described below. The internal configuration of the control unit 33 is not limited to the configuration illustrated in FIG. 5, and may be another configuration as long as it is a configuration to perform information processing described below. Moreover, a connection relationship between the processing units of the control unit 33 is not limited to the connection relationship illustrated in FIG. 5, and may be another connection relationship.

The accepting unit 34 accepts a web page acquisition request from the terminal apparatus 100. For example, the accepting unit 34 accepts an HTTP request as the web page acquisition request.

When the accepting unit 34 has accepted the web page acquisition request, the distribution unit 35 distributes a web page to the terminal apparatus 100. Specifically, the distribution unit 35 acquires a web page being the acquisition request target from the content storage unit 32, and distributes the acquired web page to the terminal apparatus 100. In such a case, when having received the web page C10, the terminal apparatus 100 transmits an advertising distribution request to the advertising distribution server 20 to display advertising content received as a response in accordance with an advertisement change process.

6. The Configuration of the Terminal Apparatus

Figure 6:
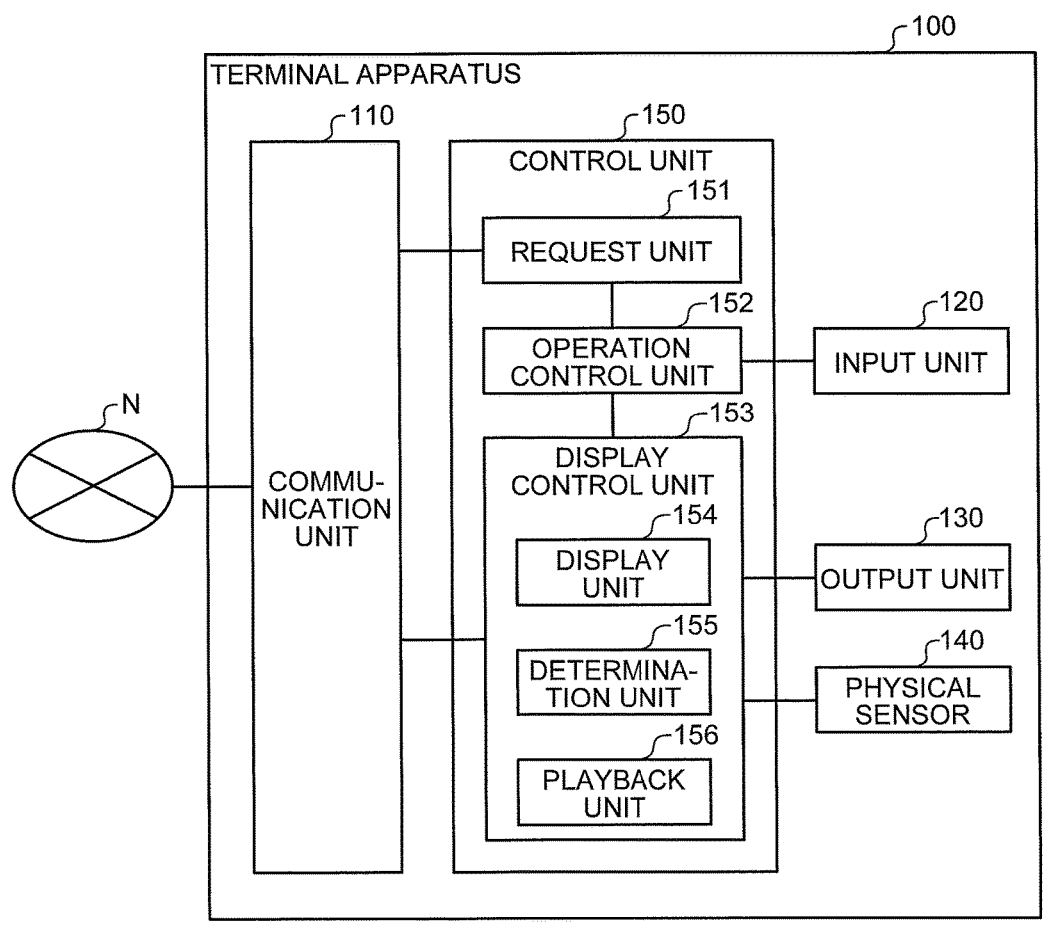
FIG. 6 is a diagram illustrating a configuration example of a terminal apparatus according to an embodiment.

Next, the configuration of the terminal apparatus 100 according to an embodiment is described with reference to FIG. 6. FIG. 6 is a diagram illustrating a configuration example of a terminal apparatus according to an embodiment. As illustrated in FIG. 6, the terminal apparatus 100 includes a communication unit 110, an input unit 120, the output unit 130, a physical sensor 140, and a control unit 150.

The communication unit 110 is realized by, for example, an NIC. The communication unit 110 is connected to the network N in a wired or wireless manner, and transmits/receives information to/from the advertising distribution server 20 and the content distribution server 30.

The input unit 120 is an input device that accepts various operations from the user. For example, the input unit 120 is realized by a keyboard, a mouse, and operating keys. The output unit 130 includes a display device for displaying various pieces of information. For example, the display device of the output unit 130 is realized by a liquid crystal display or the like. If the terminal apparatus 100 adopts a touchscreen, the input unit 120 is integral with the display device of the output unit 130.

Moreover, the output unit 130 includes an audio output device that outputs sound from a speaker, earphones, and the like, and outputs various sounds in accordance with control by the control unit 150.

The physical sensor 140 is a sensor that detects a physical state of the terminal apparatus 100. For example, the physical sensor 140 is a gyro sensor that measures the inclination of the terminal apparatus 100 in three axis direction. The physical sensor 140 is not limited to the gyro sensor. Any sensor such as an accelerometer that measures acceleration on the terminal apparatus 100, a temperature sensor that measures the temperature around the terminal apparatus, a volume sensor that measures sound around the terminal apparatus, or a brightness sensor that measures the brightness around the terminal apparatus is applicable. In the following description, any piece of information such as the inclination, acceleration, temperature, volume, and brightness to be measured by the physical sensor 140, and a combination thereof are described as the physical state of the terminal apparatus 100.

The control unit 150 is realized by, for example, a CPU or MPU executing various programs (corresponding to an example of a display program) stored in a storage device in the terminal apparatus 100, using RAM as a working area. For example, the various programs correspond to an application program called a web browser. Moreover, the control unit 150 is realized by an integrated circuit such as an ASIC or FPGA.

As illustrated in FIG. 6, the control unit 150 includes a request unit 151, an operation control unit 152, and a display control unit 153, and achieves or executes the function and operation of information processing described below. The internal configuration of the control unit 150 is not limited to the configuration illustrated in FIG. 6, and may be another configuration as long as it is a configuration to perform information processing described below. Moreover, a connection relationship between the processing units of the control unit 150 is not limited to the connection relationship illustrated in FIG. 6, and may be another connection relationship.

When having received the URL of the web page C10 from the operation control unit 152, the request unit 151 transmits, to the content distribution server 30, a request to acquire the web page C10 indicated by the received URL. Moreover, the request unit 151 transmits, to the advertising distribution server 20, an advertising content acquisition request when the web page C10 received from the content distribution server 30 includes an advertisement acquisition command.

The operation control unit 152 executes various kinds of control in accordance with the user's operations accepted via the input unit 120. For example, when the user operates the input unit 120 to display the web page C10, the operation control unit 152 outputs, to the request unit 151, the URL of the web page C10 targeted for display. Moreover, the operation control unit 152 outputs, to the display control unit 153, the content of the user's operation accepted via the input unit 120.

For example, when the finger F10 of the user has moved over the screen with the finger F10 touching the screen, the operation control unit 152 determines that a scroll operation has been performed, and notifies the display control unit 153 of what direction the finger F10 has moved in, that is, the scroll direction, and the movement amount of the finger, that is, the scrolled amount. In the following description, the scroll direction and the scrolled amount are collectively described as the content of the scroll operation. Moreover, when the web page C10 received by the display control unit 153 includes an advertisement acquisition command, the operation control unit 152 instructs the request unit 151 to transmit an advertising content acquisition request to the advertising distribution server 20.

Moreover, the operation control unit 152 outputs, to the display control unit 153, the content of various operations performed by the user. For example, when having accepted an operation to instruct playback, pause, or the like of video content or audio content, an operation to change the volume, or any other operation, the operation control unit 152 outputs its operation content to the display control unit 153.

The display control unit 153 executes a process of displaying the received web page and advertising content on the output unit 130. For example, the control unit 150 executes control information distributed together with the advertising content using the RAM as a work area and accordingly the display control unit 153 operates as a display unit 154, a determination unit 155, and a playback unit 156 as illustrated in FIG. 6 to execute the determination and playback processes.

The display unit 154 displays the web page C10 and the content C20. Specifically, when having received the web page C10 and the content C20, the display unit 154 places the content C20 in the advertising area C11 of the web page C10, and displays the web page C10. Moreover, when having received the content of the scroll operation from the operation control unit 152, the display unit 154 reflects the scroll operation of the web page C10 and the content C20 in accordance with the received content of the scroll operation.

Moreover, the display unit 154 plays back or pauses the moving image C23 included in the content C20 following the instructions from the playback unit 156 and the operation control unit 152. For example, when having received the instructions to play back or pause the moving image C23 from the playback unit 156 and the operation control unit 152, the display unit 154 plays back or pauses the moving image C23 following the received instructions. Moreover, when the sound output mode is changed during the playback of the content C20 as a result of the process executed by the playback unit 156 or the user's operation, the display unit 154 changes the forms of the icon C21 and the volume bar C22 in accordance with the changed output mode.

Moreover, when the playback unit 156 is playing back the content C20 in the playback mode determined by the determination unit 155, the display unit 154 displays the attention display C30 indicating that the sound playback mode has been changed. For example, as described below, when having determined a playback mode indicating that sound is output at a volume level other than the volume level preset by the user, in other words, when having determined a sound mode such as a fade-in, the determination unit 155 outputs a predetermined notification to the display unit 154. When the playback unit 156 starts playing back the content C20 after receiving the predetermined notification from the determination unit 155, the display unit 154 displays the predetermined attention display C30 superimposing the attention display C30 on the content C20. The display unit 154 allows any display mode for display as long as displaying the attention display C30.

The determination unit 155 determines a playback mode of sound included in content. Specifically, when having received the content C20 including sound, the determination unit 155 determines a playback mode of the sound included in the received content C20. The determination unit 155 then notifies the playback unit 156 of the determined playback mode. For example, the determination unit 155 determines the playback mode of fading in the sound included in the content C20 and notifies the playback unit 156 of the determined playback mode.

Figure 7:
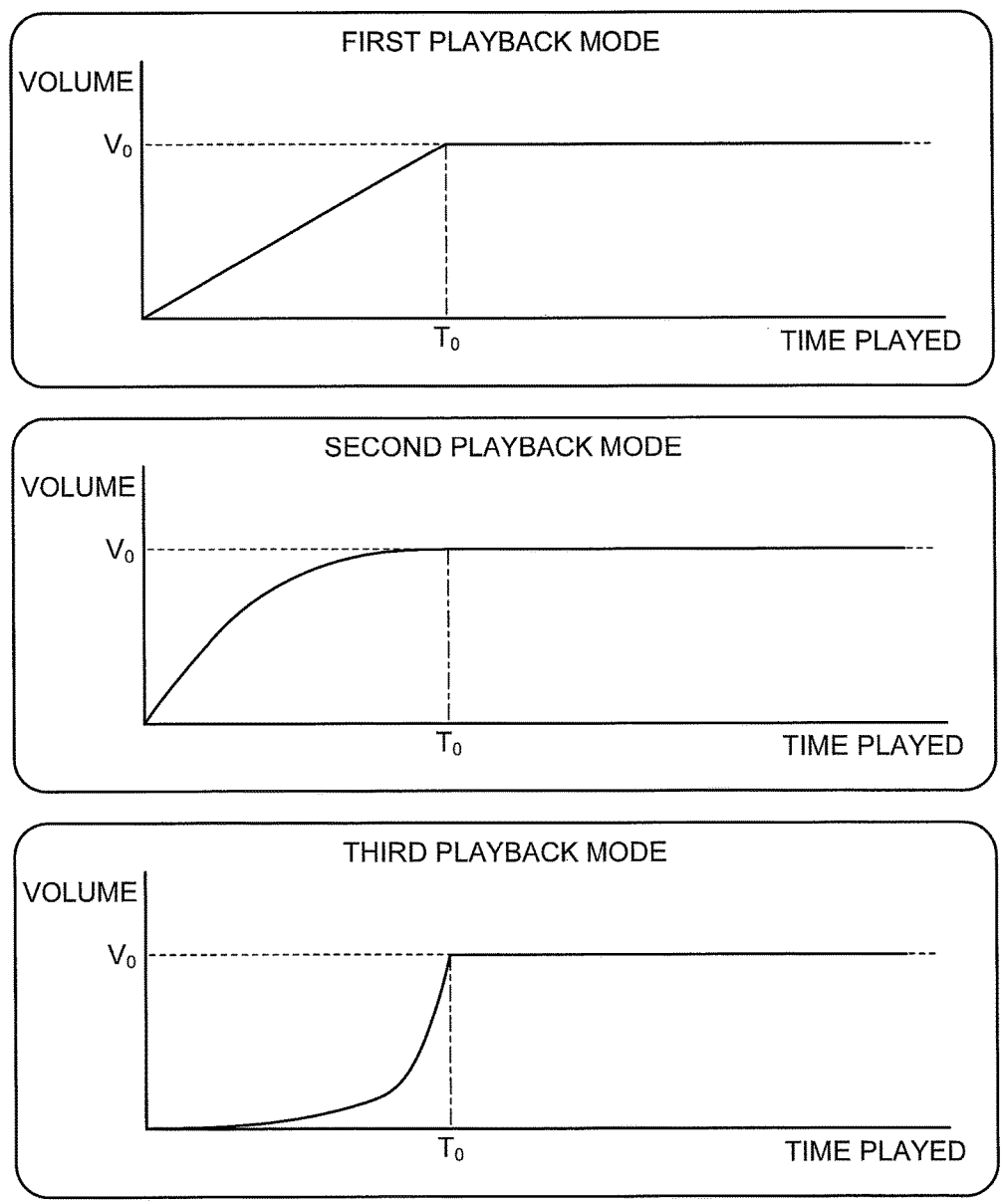
FIG. 7 is a diagram for explaining examples of sound playback modes to be determined by a terminal apparatus according to an embodiment.

Here, examples of the sound playback modes to be determined by the determination unit 155 are described with reference to FIG. 7. FIG. 7 is a diagram for explaining examples of sound playback modes to be determined by a terminal apparatus according to an embodiment. The examples illustrated in FIG. 7 describe graphs indicating temporal changes of the volume in first, second, and third playback modes. Here, the temporal changes of the volume are plotted with a solid line on each graph where the vertical axis represents volume and the horizontal axis represents time played. Moreover, in the examples illustrated in FIG. 7, time before the completion of a fade-in is expressed as "$T_0$", and the volume level set by the user as "$V_0$".

For example, the determination unit 155 determines the first playback mode as the playback mode of sound included in content. Such a first playback mode is a mode of increasing the volume from "0" to "$V_0$" at a constant increasing rate during the time from time played "0", which is the time of the start of the playback of the content, to "$T_0$".

Moreover, for example, the determination unit 155 determines the second playback mode as the playback mode of sound included in content. Such a second playback mode is a mode of increasing the volume logarithmically from "0", which is the mute state, to "$V_0$" during the time from the time played "0", which is the time of the start of the playback of the content, to "$T_0$". In other words, when having determined the second playback mode, the determination unit 155 increases the volume from "0" to "$V_0$" in a mode where the volume increasing rate is maximum at the playback of the content and is minimum immediately before the time played "$T_0$".

Moreover, for example, the determination unit 155 determines the third playback mode as the playback mode of sound included in content. Such a third playback mode is a mode of increasing the volume exponentially from "0" to "$V_0$" during the time from the time played "0", which is the time of the start of the playback of the content, to "$T_0$". In other words, when having determined the third playback mode, the determination unit 155 increases the volume from "0" to "$V_0$" in a mode where the volume increasing rate is minimum at the playback of the content and is maximum immediately before the time played "$T_0$".

In terms of the timing when the determination unit 155 determines a playback mode, any timing is acceptable as long as the playback mode is determined before the playback of the content C20. For example, when having determined that the playback unit 156 plays back the content C20 as described below, the determination unit 155 puts the start of the playback on hold, determines a sound playback mode, and notifies the playback unit 156 of the determined playback mode. The determination unit 155 may cause the content C20 to start being played back in the notified playback mode. In other words, the determination unit 155 may determine that the playback unit 156 plays back the content C20, then determine a playback mode before the playback of the content C20, and cause the playback unit 156 to play back the content C20 in the determined playback mode.

Moreover, when the playback of the content has been paused, the determination unit 155 redetermines a sound playback mode for the time the playback will be resumed in accordance with a predetermined condition. For example, when the playback of the content has been paused, the determination unit 155 identifies the time played before the pause. When the time played before the pause is shorter than a predetermined threshold value, the determination unit 155 redetermines a playback mode of fading in for the time the sound will be resumed, and notifies it to the playback unit 156. On the other hand, when the time played before the pause is longer than the predetermined threshold value, the determination unit 155 determines a playback mode of playing back the sound at a predetermined volume level (such as the volume level set by the user) for the time the sound will be resumed, and notifies it to the playback unit 156.

The determination unit 155 may determine a sound mode for the time the playback will be resumed in accordance with other conditions. For example, when the sound was played back at a predetermined volume level at the playback of the content, the determination unit 155 may determine a playback mode where the sound is played back at the predetermined volume level also for the time the playback will be resumed. In other words, when the sound was not played back at a volume level other than the volume level set by the user at the playback of the content, the determination unit 155 may determine the playback mode where the sound is played back at the predetermined volume level. Moreover, when the fade-in of the sound was completed before the pause, the determination unit 155 may determine the playback mode of playing back the sound at the predetermined volume level. Moreover, when the fade-in of the sound was not completed before the pause, the determination unit 155 may determine a playback mode of fading in from the volume level of when the content was paused to the predetermined volume level, in other words, a playback mode of continuing the playback mode determined before the pause.

The determination unit 155 can determine a sound mode in accordance with any condition in accordance with the location and state of the terminal apparatus 100. For example, the determination unit 155 may determine a sound mode in accordance with the physical state of the terminal apparatus 100 measured by the physical sensor 140. Moreover, the determination unit 155 can determine a sound mode in accordance with the type of content targeted to determine its sound mode, the type of sound included in the content, the content of the web page C10 where the content is arranged, the user's settings, and any other condition. An example of such a process is described below.

When playing back content, the playback unit 156 plays back sound included in the content in the playback mode determined by the determination unit 155. For example, when the web page C10 where the content C20 is placed is included, the playback unit 156 identifies the position of the content C20 to be displayed inside or outside the screen, and determines, in accordance with the identified position, whether or not a predetermined area of the content C20 has been displayed on the screen. When the content C20 has been displayed on the screen, or when the user has performed an operation to play back the content C20, the playback unit 156 starts playing back the content C20. Specifically, the playback unit 156 plays back the sound included in the content C20 in a playback mode received from the determination unit 155 and also plays back the moving image C23 included in the content C20.

Moreover, when a predetermined area of the content C20 has moved out of the screen, or when the user has performed an operation to pause the playback of the content C20, the playback unit 156 pauses the playback of the content C20. When the content C20 has been displayed on the screen, or when the user has performed an operation to play back the content C20, the playback unit 156 plays back the sound included in the content C20 in a playback mode newly determined by the determination unit 155 and also plays back the moving image C23.

When, for example, playing back and pausing the content C20, the playback unit 156 outputs various instructions to the display unit 154 to control the playback, pause, and the like of the content C20. Moreover, the playback unit 156 is assumed to output control signals to the speaker, earphones, and the like of the output unit 130 to control the sound included in the content.

7. Variations of the Determination and Playback Processes

In the above description, the examples of the determination and playback processes by the terminal apparatus 100 were described using the display modes illustrated by example in FIG. 1. However, the embodiments are not limited to the above examples. A description is given hereinafter of variations of the determination and playback processes to be executed by the terminal apparatus 100. The determination process described below is achieved by, for example, the determination unit 155, and the playback process is achieved by, for example, the playback unit 156. However, the embodiments are not limited to the above description.

7-1. Regarding the Determination Process Depending on the Type of Sound

In the above-mentioned examples, the terminal apparatus 100 fades in the sound included in the content C20 at the playback of the content C20. However, the embodiments are not limited to the above examples. For example, the sound included in the content C20 may include a plurality of types of sounds such as a sound logo, background sound, a sound effect, and a narration. It is considered that such sounds include a sound that a registerer (for example, an advertiser) who has registered the content C20 desires the user to listen to, and a sound that does not matter even if the user becomes unable to hear due to a fade-in.

Hence, when the sound of the content C20 includes a plurality of sounds, the terminal apparatus 100 may determine a playback mode for each sound in accordance with the type of the sound. For example, the advertising distribution server 20 accepts the registration of each sound included in the content C20 from the advertiser terminal 10, depending on the type of the sound. A more specific example is described. The advertising distribution server 20 accepts the registration of sound data including a sound logo, sound data including background sound, and sound data including a narration, as playback data to be simultaneously played back at the playback of the moving image C23 included in the content C20. The advertising distribution server 20 then assigns a tag indicating the type of sound datum to each accepted sound datum, and transmits the sound data together with the moving image C23 to the terminal apparatus 100.

In such a case, the terminal apparatus 100 determines a playback mode depending on the type of received sound datum. For example, the terminal apparatus 100 determines a playback mode of playing back the sound datum including the sound logo at a predetermined volume level (for example, a volume level set by the user or advertiser) as a playback mode for the time the sound datum is played back. Moreover, the terminal apparatus 100 determines a playback mode of playing back the sound datum including the background sound at a predetermined volume level as a playback mode for the time the sound datum is played back. Moreover, the terminal apparatus 100 determines a playback mode of fading in the sound datum including the narration as a playback mode for the time the sound datum is played back.

Here, FIG. 8 is a diagram for explaining other examples of sound modes to be determined by a determination unit according to an embodiment. The examples illustrated in FIG. 8 describe examples of playback modes to be determined depending on the types of sounds, in a format similar to FIG. 7. For example, the terminal apparatus 100 determines a playback mode of playing back the sound datum including the background sound, that is, BGM, at a predetermined volume level from the time played "0" as illustrated as a fourth playback mode. On the other hand, the terminal apparatus 100 determines a playback mode of fading in the narration from the time played "0" to "$T_0$" as illustrated as the fourth playback mode.

Moreover, the terminal apparatus 100 determines a playback mode of playing back a part, which includes the sound logo, of the sound datum including the sound logo, at a predetermined volume level as illustrated as a fifth playback mode. For example, a time period including the sound log is expressed as "$T_1$". The terminal apparatus 100 plays back at a predetermined volume level "$V_0$" even if the time period "$T_1$" is before the time "$T_0$". The terminal apparatus 100 may always play back a sound datum including only a sound logo at the predetermined volume level.

In the above-mentioned examples, the terminal apparatus 100 determines a playback mode for a sound registered depending on the type of the sound. However, the embodiments are not limited to the examples. For example, the advertising distribution server 20 may make a sound analysis of the registered sound and accordingly temporally cut out the part including the sound logo, and set the sound of such a part as a sound datum including the sound logo. Moreover, the advertising distribution server 20 may use the frequency characteristics of sound and the like to divide the sound into a narration and background sound, and create each sound datum. Moreover, the terminal apparatus 100 may execute the above-mentioned sound analysis process to divide sound included in content into sound data by the type of sound, and determine their playback modes in accordance with the types of sounds included in each sound datum.

In this manner, the terminal apparatus 100 determines a playback mode for each type of sound and accordingly can play back sounds included in content in more appropriate modes. The terminal apparatus 100 may determine the playback mode of fading in even for BGM and a sound logo, in accordance with, for example, the type of content.

7-2. Regarding the Determination Process in Accordance with the Type of Content

The above-mentioned terminal apparatus 100 determines the playback mode of fading in sound for the received content C20. Here, the terminal apparatus 100 may determine the playback mode of fading in sound for all content that include sound, or may determine the playback mode of fading in sound or the playback mode of playing back sound at a predetermined volume level in accordance with the type of content.

For example, when having received content for which the registerer permitted the mode of fading in sound among content registered in the advertising distribution server 20, the terminal apparatus 100 determines the playback mode of fading in sound. On the other hand, when having received content for which the registerer did not permit the mode of fading in sound among the content registered in the advertising distribution server 20, the terminal apparatus 100 determines the playback mode of playing back sound at a predetermined volume level.

Moreover, in another example, the terminal apparatus 100 may determine the playback mode of fading in sound when the received content is content related to an advertisement, and determine the playback mode of playing back at a predetermined volume level when the received content is, for example, a game or a moving image other than an advertisement.

In this manner, the terminal apparatus 100 determines a playback mode of sound included in content in accordance with the type of the content. Hence, the terminal apparatus 100 can prevent the playback of the sound included in the content in an inappropriate mode.

7-3. Regarding the Determination Process in Accordance with the Physical State of the Terminal Apparatus Here, the terminal apparatus 100 may determine a playback mode of sound included in content in accordance with the physical state of the terminal apparatus 100. For example, it is considered that the terminal apparatus 100 can predict to some extent the state of a user who uses the terminal apparatus 100, based on the inclination, acceleration, temperature, volume, brightness, and the like of the terminal apparatus 100. For example, when the inclination of the terminal apparatus 100 is larger than a predetermined threshold value, the terminal apparatus 100 can predict that the user is using the terminal apparatus 100 while lying down. Moreover, for example, when the acceleration and impact related to the terminal apparatus 100 agree with a predetermined pattern to some extent, the terminal apparatus 100 can predict that the user is moving.

Moreover, for example, the terminal apparatus 100 can predict the location of the user and the travel means of the user from, for example, the location identified with the GPS (Global Positioning System), iBeacon, and the like, and the travel speed of the terminal apparatus 100. A specific example is described. When there is a railroad track near the location of the user, and the travel speed of the user is faster than a predetermined threshold value, the terminal apparatus 100 can predict that the user is on a train.

Here, it is considered that when having determined in accordance with the location and state of the user whether or not to output sound included in content at a predetermined volume level, the terminal apparatus 100 can prevent the playback of the sound included in the content in an inappropriate state. For example, when the user is using a public transport such as a train or bus, the terminal apparatus 100 can determine that the mode of outputting sound included in content at a predetermined volume level is an inappropriate mode.

Hence, the terminal apparatus 100 determines a playback mode of sound included in content in accordance with the physical state of the terminal apparatus 100. For example, when the inclination of the terminal apparatus 100 is larger than the predetermined threshold value, in other words, when it is predicted that the user is using the terminal apparatus 100 while lying down, the terminal apparatus 100 determines the playback mode of outputting the sound included in the content at a predetermined volume level. Moreover, when the travel speed of the terminal apparatus 100 is faster than the predetermined value, or when the terminal apparatus 100 is located in a public building such as a library, station, or community center, the terminal apparatus 100 determines the playback mode of fading in sound. Moreover, when the terminal apparatus 100 is at a location where the output of sound is predicted to be acceptable, such as a concert hall or music store, the terminal apparatus 100 determines the playback mode of outputting sound at the predetermined volume level.

Moreover, the terminal apparatus 100 may measure ambient noise to output sound included in content at a predetermined volume level when the measured noise is larger than a predetermined threshold value, or to fade in the sound included in the content when the noise is equal to or less than the predetermined threshold value. Moreover, the terminal apparatus 100 may determine any of the first to fifth playback modes in accordance with the physical state of the terminal apparatus 100. Moreover, when the physical state of the terminal apparatus 100 satisfies a given predetermined state, the terminal apparatus 100 may determine the playback mode of fading in, or the playback mode of outputting sound at a predetermined volume level.

In this manner, the terminal apparatus 100 determines a playback mode of sound in accordance with the physical state of the terminal apparatus 100, and accordingly can output the sound in a more appropriate mode.

7-4. Regarding the Determination Process in Accordance with Settings of Terminal Apparatuses Located in the Surroundings Moreover, the terminal apparatus 100 may determine a playback mode in accordance with the settings of surrounding terminal apparatuses. For example, when the surrounding terminal apparatuses are in a state of outputting sound at a predetermined volume level, it is predicted that the terminal apparatus 100 does not constitute a nuisance to the surroundings even if it outputs sound. Hence, the terminal apparatus 100 uses near field communication such as Wi-Fi (registered trademark) or Bluetooth (registered trademark) to collect information indicating volume settings of the surrounding terminal apparatuses. The terminal apparatus 100 may use information indicating the location of each terminal apparatus and the setting of each terminal apparatus collected in a client server on a network to collect information indicating the volume settings of the surrounding terminal apparatuses. Moreover, the terminal apparatus 100 may collect the settings and information of other terminal apparatuses connected to the same network.

Moreover, the terminal apparatus 100 identifies the volume settings of the other terminal apparatuses existing in the surroundings based on the collected information. When a predetermined percentage or more of the other terminal apparatuses existing in the surroundings are set in the sound mute state, the terminal apparatus 100 determines the playback mode of fading in sound included in content. Moreover, when the predetermined percentage or more of the other terminal apparatuses existing in the surroundings are not set in the sound mute state, the terminal apparatus 100 determines the playback mode of playing back sound included in content at a predetermined volume level.

The terminal apparatus 100 may determine a final volume level for a fade-in in accordance with the ratio of terminal apparatuses that are not set in the sound mute state to all the surrounding terminal apparatuses, and the volume level set by each terminal apparatus. Moreover, when there is a terminal apparatus that is actually outputting sound among the surrounding terminal apparatuses, the terminal apparatus 100 may determine a playback mode in accordance with the volume level of the sound being output by that terminal apparatus, the duration that the sound was output, and the like.

Moreover, the terminal apparatus 100 may use an SNS (Social Networking Service) to collect the state and setting of a terminal apparatus located in close range and determine a playback mode in accordance with the collected state and setting. Moreover, the terminal apparatus 100 may determine a playback mode for the SNS based on information posted by the terminal apparatus located in close range. For example, when a terminal apparatus located in the surroundings has posted a comment that it is at a concert, the terminal apparatus 100 may determine the playback mode of outputting sound at a predetermined volume level.

In this manner, the terminal apparatus 100 determines a sound playback mode in accordance with the settings of surrounding terminal apparatuses. Hence, the terminal apparatus 100 can prevent the output of sound in an inappropriate mode.

7-5. Regarding the Determination Process in Accordance with the History of the Function of the Terminal Apparatus Moreover, the terminal apparatus 100 may determine a sound playback mode based on the use history of a function of the terminal apparatus 100. For example, recent years' terminal apparatuses include terminal apparatuses having an electronic money function for paying at public transports such as trains and buses, stores, and automatic vending machines. Hence, the terminal apparatus 100 may determine whether or not to be using a public transport based on the use history of the electronic money function and, when having determined that it is using a public transport, determine the playback mode of fading in.

For example, when performing the determination process, the terminal apparatus 100 acquires the use history of the electronic money function, and determines whether or not that the latest record of a wicket gate entrance/exit history is an entrance record. The terminal apparatus 100 may determine the playback mode of fading in when the latest record of the wicket gate entrance/exit history is an entrance record, and determine the mode of outputting sound at a predetermined volume level when the latest record of the wicket gate entrance/exit history is an exit record.

Moreover, for example, the terminal apparatus 100 acquires the use history of the electronic money function, and determines whether or not a predetermined time has passed since it got aboard a bus. The terminal apparatus 100 may determine the playback mode of fading in when the predetermined time has not passed since it got aboard the bus, and determine the mode of outputting sound at a predetermined volume level when the predetermined time has passed since it got aboard the bus.

Moreover, the terminal apparatus 100 may determine a playback mode based on a use history of a coupon using near field communication, a use history of the GPS, an application execution history, or the like other than the electronic money function. For example, when executing the determination process, the terminal apparatus 100 determines whether or not a predetermined period of time has passed since a predetermined application played back music content or video content. When having determined that the predetermined period of time has not passed since the playback of the music content or video content, the terminal apparatus 100 may determine the playback mode of playing back sound at a predetermined volume level. Moreover, the terminal apparatus 100 may determine a sound playback mode based on the volume level of when the music content or video content was played back. Moreover, the terminal apparatus 100 may determine a sound playback mode depending on whether or not earphones are inserted, or whether or not the music content or video content was played back using the earphones.

In this manner, the terminal apparatus 100 determines a playback mode of sound included in content in accordance with a use history of a function of the terminal apparatus 100. Accordingly, the terminal apparatus 100 can prevent the output of sound in such an inappropriate mode as that suddenly allows the output of sound on a train or the like. Moreover, the terminal apparatus 100 determines a playback mode of sound included in content in accordance with the playback mode of when sound was played back within a predetermined period of time. Accordingly, the terminal apparatus 100 can output sound in an appropriate playback mode.

Figure 9:
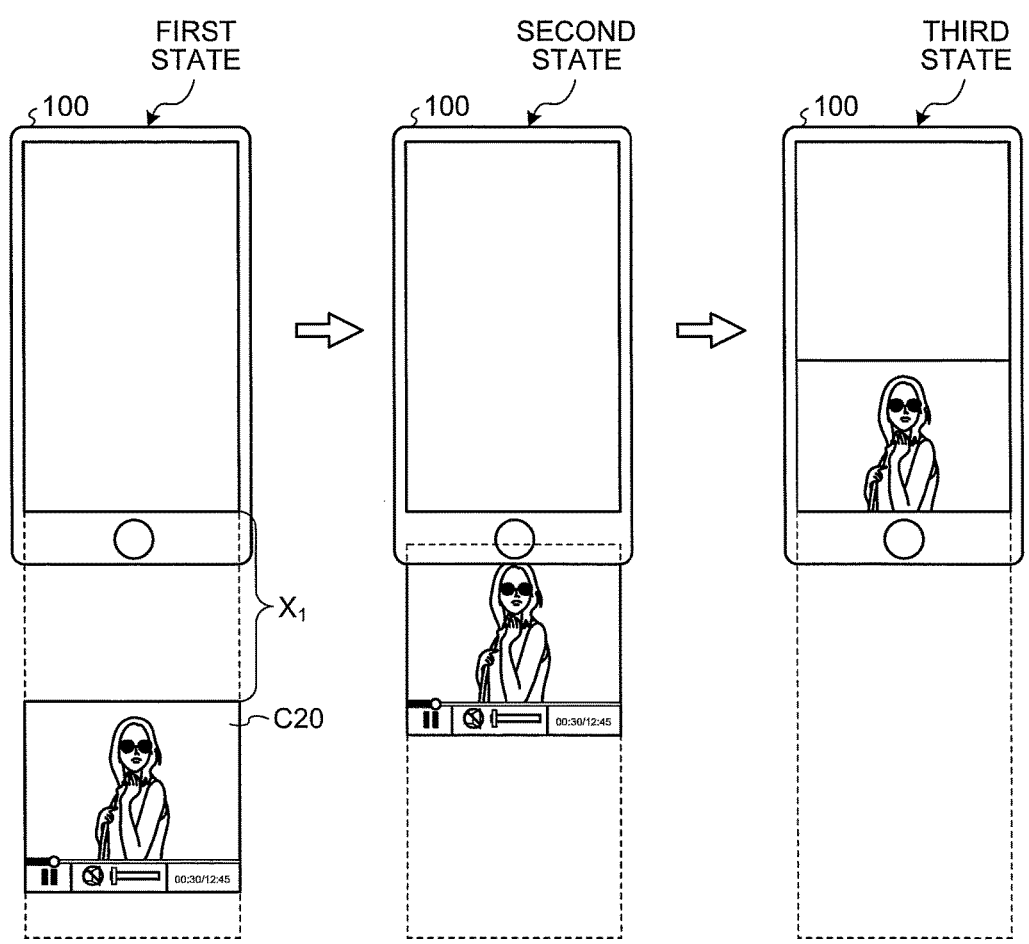
FIG. 9 is a diagram for explaining a process where a terminal apparatus according to an embodiment determines a playback mode in accordance with the position of content.

7-6. Regarding the Determination Process in Accordance with the Position of Content Here, the terminal apparatus 100 may determine a sound playback mode in accordance with the position where content including sound is placed. For example, FIG. 9 is a diagram for explaining a process that a terminal apparatus according to an embodiment determines a playback mode in accordance with the position of content. For example, the terminal apparatus 100 scrolls the web page C10 and the content C20 in accordance with a user's scroll operation. When the distance between the content C20 and the screen of the terminal apparatus 100 becomes "$X_1$", the terminal apparatus 100 starts playing back the sound included in the content C20.

In such a case, the terminal apparatus 100 changes the volume in accordance with the position of the content C20. For example, when the distance between the content C20 and the screen of the terminal apparatus 100 becomes "$X_1$" as illustrated in a first state of FIG. 9, the terminal apparatus 100 determines a playback mode of playing back the sound at "20 percent" of the set volume. Moreover, when the screen distance between the content C20 and the terminal apparatus 100 is further reduced by the scroll operation as illustrated in a second state of FIG. 9, the terminal apparatus 100 determines a playback mode of playing back the sound at, for example, "50 percent" of the set volume. Moreover, when a predetermined area of the content C20 is displayed by the scroll operation on the screen as illustrated in the second state of FIG. 9, the terminal apparatus 100 determines a playback mode of playing back the sound at, for example, "80 percent" of the set volume.

In other words, the terminal apparatus 100 starts playing back the content C20 when the content C20 is still located outside the screen, and also gradually increases the volume for playback as the content C20 approaches the screen with the scroll operation. Hence, the terminal apparatus 100 can let the user know the existence of the content including the sound, and provide an opportunity to set the volume level. As a result, the terminal apparatus 100 can prevent the output of the sound in an inappropriate mode.

The terminal apparatus 100 may start playing back the content C20 when the content C20 is still located outside the screen as illustrated in the first state of FIG. 9, and play back the content C20 again from the beginning when a predetermined area of the content C20 is displayed on the screen as illustrated in a third state of FIG. 9. At this point in time, the terminal apparatus 100 may output the sound at a predetermined volume level or fade in the sound. In this manner, when the content that has started being played back outside the screen is displayed on the screen, the terminal apparatus 100 plays back the content again from the beginning and accordingly can let the user view the content of the content without any missing piece.

7-7. Regarding the Determination Process in Accordance with the User's Operation Moreover, the terminal apparatus 100 may determine a playback mode in accordance with the user's operation. For example, the terminal apparatus 100 may continue playing back the content in the mute state when the user has selected the attention display while the attention display stays on screen. Moreover, in another example, the terminal apparatus 100 may continue playing back the content while outputting the volume at a preset predetermined volume level when the user has selected the attention display while the attention display stays on screen. Moreover, when the user has operated the volume bar C22 or has performed an operation to change the volume setting via a physical input device of the terminal apparatus 100, during the playback of the content, the terminal apparatus 100 may continue playing back the content while outputting the sound at the volume level set as a result of the operation.

In this manner, when the user has selected the attention display, the terminal apparatus 100 changes a playback mode of sound included in content to a predetermined playback mode. Moreover, when the volume is operated during the playback of the content, the terminal apparatus 100 changes the volume for the playback of the content in accordance with the operation. Hence, the terminal apparatus 100 can prevent the output of the sound in an inappropriate mode.

7-8. Others

Moreover, the terminal apparatus 100 may determine a playback mode in accordance with a network connected. For example, the terminal apparatus 100 may determine the playback mode of fading in sound included in content when connected to wide range Wi-Fi or public Wi-Fi. Moreover, the terminal apparatus 100 may determine the playback mode of fading in sound, or a playback mode of not outputting sound when the network connected is a network of a company or public institution.

Moreover, the terminal apparatus 100 may determine a playback mode in accordance with a current time. For example, since the user is predicted to be on the way to work or in the company during the time from the early morning to the evening, the terminal apparatus 100 may determine the playback mode of fading in sound included in content. Moreover, the terminal apparatus 100 may determine the playback mode of fading in sound included in content during the time from the middle of the night to the early morning, considering noise to the surroundings.

Moreover, the terminal apparatus 100 may combine any of the above-mentioned pieces of information and states as appropriate to determine a playback mode. Moreover, the terminal apparatus 100 may combine any of the above-mentioned pieces of information and states as appropriate to learn a model of a state where the output of sound is acceptable, and determine a playback mode based on the learning result.

8. The Process Flow of the Terminal Apparatus 100

Figure 10:
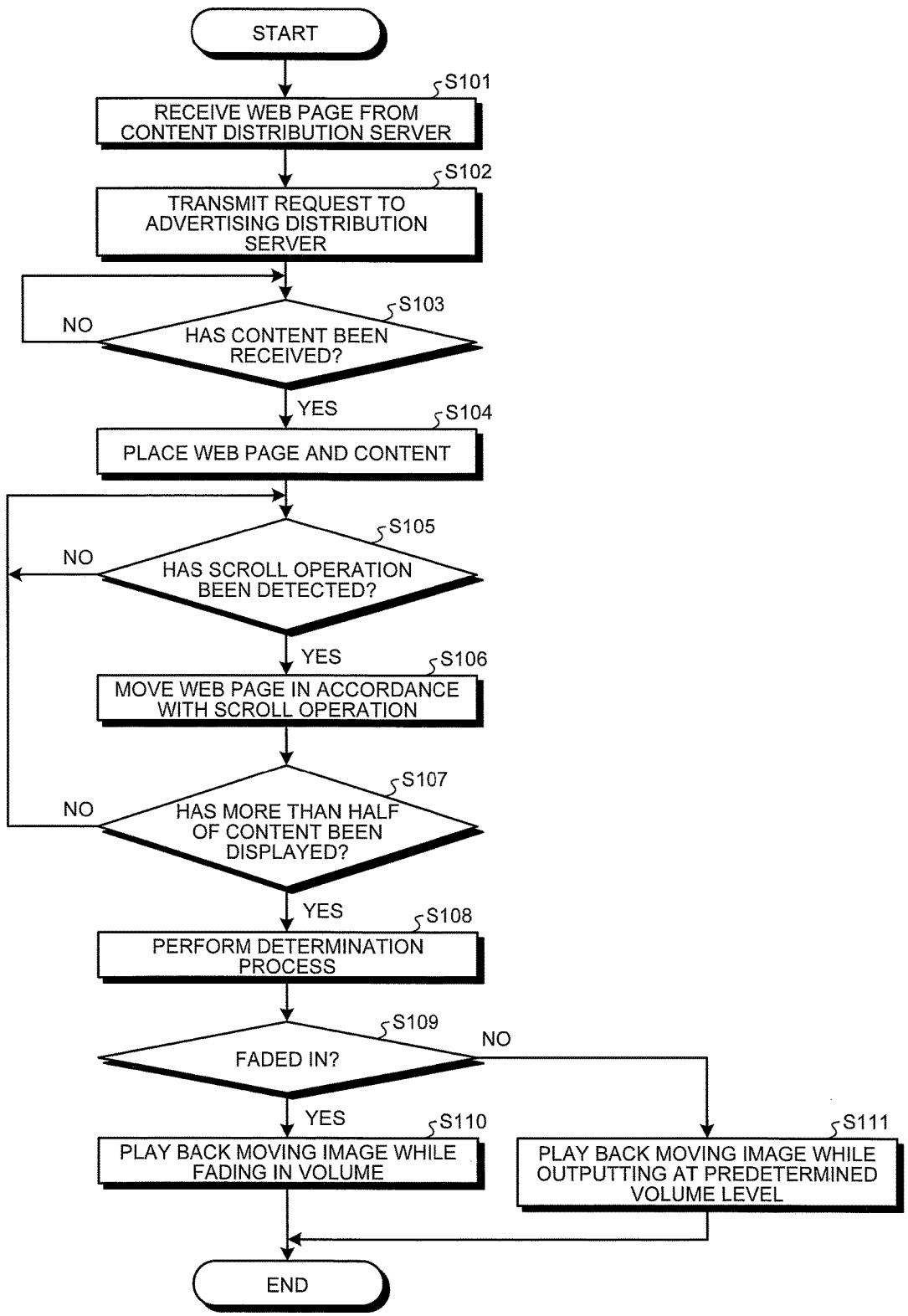
FIG. 10 is a flowchart illustrating an example of the flow of determination and playback processes to be executed by a terminal apparatus according to an embodiment.

Next, a procedure for processes to be executed by the terminal apparatus 100 that has executed control information is described with reference to FIG. 10. FIG. 10 is a flowchart illustrating an example of the flow of the determination and playback processes to be executed by a terminal apparatus according to an embodiment.

In the example illustrated in FIG. 10, the terminal apparatus 100 requests the content distribution server 30 to distribute the web page C10 in response to a user's operation, and receives the web page C10 from the content distribution server 30 (Step S101). Next, the terminal apparatus 100 transmits a distribution request to the advertising distribution server 20 when the distributed web page C10 includes an advertisement acquisition command (Step S102). Next, the terminal apparatus 100 determines whether or not to have received the content C20 (Step S103). When having determined to have not received the content C20 (Step S103: No), then the terminal apparatus 100 executes Step S103 again.

Moreover, when having received the content C20 (Step S103: Yes), the terminal apparatus 100 displays the web page C10 and also places the content C20 in the advertising area C11 and displays the content C20 (Step S104). The terminal apparatus 100 then determines whether or not a scroll operation has been detected (Step S105) and, when a scroll operation has been detected (Step S105: Yes), moves the web page C10 and the content C20 in accordance with the scroll operation (Step S106). Next, the terminal apparatus 100 determines whether or not more than a half of the content C20 has been displayed (Step S107).

When more than half of the content C20 has been displayed (Step S107: Yes), the terminal apparatus 100 executes the determination process and determines a playback mode (Step S108). For example, the terminal apparatus 100 determines the playback mode of fading in sound, or the playback mode of playing back sound at a predetermined volume level. When fading in sound (Step S109: Yes), the terminal apparatus 100 plays back a moving image included in the content C20 while fading in the sound (Step S110), and ends the process. On the other hand, when not fading in the sound (Step S109: No), in other words, when playing back the sound at the predetermined volume level, the terminal apparatus 100 plays back the moving image included in the content C20 while outputting the sound at the predetermined volume level (Step S111), and ends the process.

On the other hand, when a scroll operation has not been detected (Step S105: No), the terminal apparatus 100 executes Step S105 again. Moreover, when more than a half of the content C20 has not been displayed (Step S107: No), the terminal apparatus 100 executes Step S105 again.

9. Modifications

The advertising distribution system 1 according to the above embodiments may be carried out in various different modes other than the above embodiments. Hence, other embodiments of the advertising distribution system 1 are described below.

9-1. The Type of Content

The above-mentioned terminal apparatus 100 plays back, as the content C20, the content C20 related to the advertisement registered by the advertiser. However, the embodiments are not limited to this, and the terminal apparatus can apply the determination and playback processes to any content. For example, the terminal apparatus 100 can apply the above-mentioned determination and playback processes to any content such as games and web pages that accept operations from users, other than advertisements. A more specific example is described. The terminal apparatus 100 may execute the determination and playback processes, for example, when executing a game or when displaying an interactive web page created by technologies such as Flash and CSS (Cascading Style Sheets) to prevent the output of sound in an inappropriate mode.

Moreover, the terminal apparatus 100 may execute the determination and playback processes upon the playback of content including only sound to prevent the output of the sound in an inappropriate mode.

9-2. Regarding Logs

The terminal apparatus 100 may log a user's operations when playing back content actually displayed or content in a playback mode determined by the determination process. For example, when playing back the content in the playback mode determined by the determination process, the terminal apparatus 100 acquires logs indicating, for example, whether or not the user selected the attention display, whether or not the user performed an operation to change the volume, and the content of the operation to change the volume. On the other hand, the terminal apparatus 100 acquires logs of, for example, whether or not the content C20 was played back, the time played of the content C20, whether or not a pause was made, and the timing of the pause.

The logs acquired by the terminal apparatus 100 in this manner become useful upon, for example, the update of the CTR of each advertising content, and the reporting of advertising effects to an advertiser. Moreover, the logs acquired by the terminal apparatus 100 may be used to change content placed in a landing page. For example, when the user has selected the content C20, the terminal apparatus 100 may notify various logs to a server that distributes landing pages, and accept the distribution of different landing pages in accordance with the content of the logs.

Moreover, the terminal apparatus 100 may determine a playback mode based on the log history. For example, the terminal apparatus 100 accepts the distribution of the content C20 from the advertising distribution server 20 and also receives a playback mode determined based on the content of logs related to the content C20. In such a case, the terminal apparatus 100 may play back the sound included in the content C20 in the received playback mode.

Moreover, the terminal apparatus 100 may determine a playback mode based on the CTR of a landing page corresponding to the content C20. For example, the terminal apparatus 100 may determine the playback mode of outputting the sound at a predetermined volume level when the CTR of the landing page corresponding to the content C20 is higher than a predetermined threshold value, and determine the playback mode of fading in sound when the CTR of the landing page is lower than the predetermined value.

The advertising distribution server 20 may change the amount charged to the advertiser, based on the above-mentioned logs. For example, the advertising distribution server 20 may provide a difference between the amount charged upon having executed the determination and playback processes, and the amount charged upon having played back at a predetermined volume level without executing the determination process.

9-3. Regarding Fade-Ins

In the above-mentioned example, the terminal apparatus 100 determines the playback mode of fading in sound. However, the embodiments, are not limited to this. The terminal apparatus 100 may determine any playback mode as long as sound can be output in an appropriate mode. For example, the terminal apparatus 100 may determine a playback mode of increasing the volume in stages. Moreover, the terminal apparatus 100 may output a sound of a frequency band that is hard to propagate to the surroundings at a predetermined volume level, and then gradually increasing the output frequency band at the predetermined volume level.

9-4. Regarding the Control Information

The above terminal apparatus 100 uses the control information to be distributed together with advertising content by the advertising distribution server 20 to execute the above display process. However, the embodiments are not limited to this. For example, the terminal apparatus 100 receives the above control information together with a web page from the content distribution server 30 and receives a display instruction together with advertising content from the advertising distribution server 20. The terminal apparatus 100 may execute the control information received from the content distribution server 30 and also change the display mode of the advertising content, following the received display instruction.

Moreover, the terminal apparatus 100 may achieve the display process of the web page C10, the above-mentioned advertisement change process, and the like by downloading an application in advance to the terminal apparatus 100 to execute the processes and executing the application.

9-5. Apparatus Configurations

Moreover, the above embodiments illustrate the example where the advertising distribution system 1 includes the advertising distribution server 20 and the content distribution server 30. However, the advertising distribution server 20 and the content distribution server 30 may be formed as one apparatus. In this case, the advertising distribution server 20 illustrated in FIG. 3 includes, for example, the content storage unit 32, the accepting unit 34, and the distribution unit 35, which are illustrated in FIG. 5. When having accepted a web page acquisition request from the terminal apparatus 100, the advertising distribution server 20 distributes a web page that does not include an advertisement acquisition command, together with advertising content, to the terminal apparatus 100.

Moreover, the above embodiments illustrate the example where the advertising distribution server 20 distributes advertising content to the terminal apparatus 100. However, the content distribution server 30 may acquire the advertising content from the advertising distribution server 20. In this case, the request accepting unit 26 of the advertising distribution server 20 accepts an advertising content acquisition request from the content distribution server 30. Moreover, the advertising distribution server 20 distributes advertising content to the content distribution server 30. Moreover, the content distribution server 30 distributes, to the terminal apparatus 100, a web page that does not include an advertisement acquisition command, together with the advertising content acquired from the advertising distribution server 20.

9-6. The Recording of Operations of the Terminal Apparatus

Moreover, the above-mentioned terminal apparatus 100 may transmit, to the advertising distribution server 20, records of how much the user has operated the terminal apparatus 100 for a web page where content is placed. Specifically, the terminal apparatus 100 records, for example, scroll operations performed by the user on the web page C10 where the content C20 is placed.

Moreover, it is also possible that the terminal apparatus 100 records various operations performed by the user on the terminal apparatus 100, such as a tap operation (that is, a selection operation) on the content C20, the number of times a web page is reloaded, and a send operation on information specifying the content C20 from the terminal apparatus (for example, a post on an SNS). The terminal apparatus 100 transmits information related to the operation history to the advertising distribution server 20.

In such a case, the advertising distribution server 20 summarizes information related to the operation history distributed from the terminal apparatus 100, and further acquires information on the analysis of the operation history information. For example, the advertising distribution server 20 acquires pieces of information such as a comparison between content with control information according to an embodiment, and content without the control information in terms of the indexes of advertising effects such as the number of scroll operations and the CTR.

Here, the operation history of a web page on which content with control information according to an embodiment is displayed can be an index indicating an advertising effect. In other words, on a web page on which the content with the control information according to the embodiment is displayed, not only does a click on the content itself by a user lead to displaying a web page linked from the content, but the operation history itself that how much the user performed the scroll operation on the web page (in other words, how much the user changed the advertising content) can also be said to be an index indicating the user's interest in the advertising content.

For example, the advertising distribution server 20 compares the number of scroll operations performed by the user, the amount of the scroll operation, the time and duration that the scroll operation was performed, whether or not the content was selected since the scroll operation was performed, and the like. Accordingly, the advertising distribution server 20 can provide an index indicating how much interest arose when the content with the control information according to the embodiment was displayed. Therefore, the advertising distribution server 20 transmits, to the advertiser terminal 10, information related to the operation history of the terminal apparatus 100. Accordingly, the advertising distribution server 20 can make a report indicating the index of an advertising effect on the web page on which the content according to the embodiment is displayed. The advertising distribution server 20 may transmit, to the advertiser terminal 10, the information related to the operation history of the terminal apparatus 100 as it is.

Consequently, the advertising distribution server 20 can suggest, to the advertiser, the usefulness of the display mode of the advertising content with the control information according to the embodiment in the terminal apparatus 100.

9-7. Others

Moreover, among the processes described in the above embodiments, all or part of the processes described assuming to be performed automatically can also be performed manually. Alternatively, all or part of the processes described assuming to be performed manually can also be performed automatically by a publicly known method. In addition, the processing procedures, specific names, information including various data and parameters, which are illustrated in the above document and drawings, can be freely changed unless otherwise specified. For example, various pieces of information illustrated in the figures are not limited to the pieces of information illustrated by example.

Moreover, each of the illustrated components of each apparatus is functionally conceptual, and is not necessarily required to be physically configured as illustrated. In other words, specific embodiments of distribution/integration of the apparatuses are not limited to the illustrations. All or part thereof can be configured, functionally or physically distributed/integrated in any units in accordance with various loads, use states, and the like. For example, the request unit 151 and the operation control unit 152, which are illustrated in FIG. 6, may be integrated.

Moreover, the above embodiments can be combined within the scope that does not contradict the content of the processes, as appropriate.

9-8. Program

Figure 11:
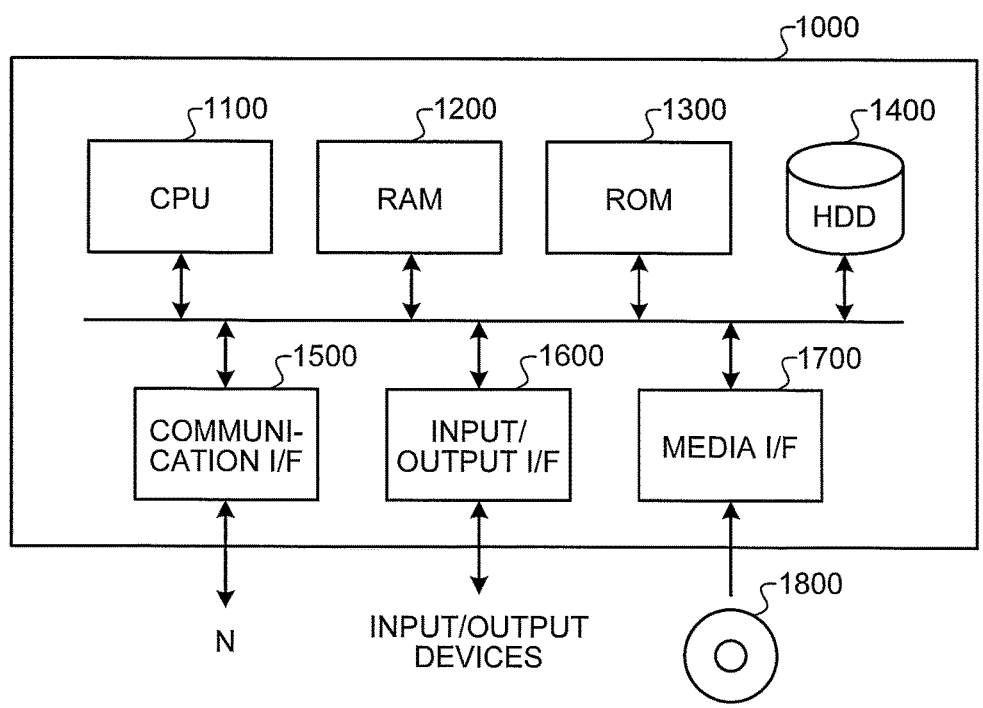
FIG. 11 is a hardware configuration diagram illustrating an example of a computer to achieve the functions of the terminal apparatus.

Moreover, the terminal apparatus 100, the advertising distribution server 20, and the content distribution server 30 according to the above embodiments are realized by, for example, a computer 1000 configured as illustrated in FIG. 11. A description is given hereinafter taking the advertising distribution server 20 as an example. FIG. 11 is a hardware configuration diagram illustrating an example of a computer to achieve the functions of the terminal apparatus. The computer 1000 includes a CPU 1100, RAM 1200, ROM 1300, an HDD 1400, a communication interface (I/F) 1500, an input/output interface (I/F) 1600, and a media interface (I/F) 1700.

The CPU 1100 operates based on a program stored in the ROM 1300 or the HDD 1400, and controls each unit. A boot program to be executed by the CPU 1100 at the startup of the computer 1000, a program dependent on hardware of the computer 1000, and the like are stored in the ROM 1300.

A program to be executed by the CPU 1100, and data to be used by the program, and the like are stored in the HDD 1400. The communication interface 1500 receives data from another apparatus via the network N, transmits the data to the CPU 1100, and transmits data generated by the CPU 1100 to another apparatus.

The CPU 1100 controls output devices such as a display and printer, and input devices such as a keyboard and a mouse, via the input/output interface 1600. The CPU 1100 acquires data from the input devices via the input/output interface 1600. Moreover, the CPU 1100 outputs the generated data to the output devices via the input/output interface 1600.

The media interface 1700 reads a program or data stored in a recording medium 1800 and provides it to the CPU 1100 via the RAM 1200. The CPU 1100 loads the program onto the RAM 1200 from the recording medium 1800 via the media interface 1700, and executes the loaded program. The recording medium 1800 is, for example, an optical recording medium such as a DVD (Digital Versatile Disc) or PD (Phase change rewritable Disk), a magneto-optical recording medium such as an MO (Magneto-Optical disk), a tape medium, a magnetic recording medium, or a semiconductor memory.

For example, when the computer 1000 functions as the advertising distribution server 20 according to an embodiment, the CPU 1100 of the computer 1000 executes a program loaded onto the RAM 1200 to achieve the function of the control unit 23. Moreover, the data in the storage unit 22, in other words, the advertising database 24, is stored in the HDD 1400. The CPU 1100 of the computer 1000 reads these programs from the recording medium 1800 and executes them. However, as another example, the CPU 1100 may acquire these programs from another apparatus.

When the computer 1000 functions as the terminal apparatus 100 according to an embodiment, the CPU 1100 of the computer 1000 executes a program loaded onto the RAM 1200 to achieve the function of the control unit 150.

When the computer 1000 functions as the content distribution server 30 according to an embodiment, the CPU 1100 of the computer 1000 executes a program loaded onto the RAM 1200 to achieve the function of the control unit 33. Moreover, the data in the content storage unit 32 is stored in the HDD 1400.

10. Effects

As described above, the terminal apparatus 100 determines a playback mode of sound included in content. When playing back the content, the terminal apparatus 100 plays back the sound included in the content in the determined playback mode. Hence, for example, the terminal apparatus 100 can prevent the output of the sound included in the content in an inappropriate mode such as that the sound is suddenly output at a high volume level, and accordingly can prevent the playback of the sound in an inappropriate mode.

The terminal apparatus 100 is best suited for in-feed advertising that displays advertising content including sound on a web page (that is, an article) where sound is not output in principle, such as a news site. For example, it is considered that the user expects that sound is not output when viewing articles on a news site, and the like. However, with increases of the mode where content including sound such as a video content is distributed as advertising content, a situation is predicted in which sound is output unexpectedly when the user views articles and the like. On the other hand, the terminal apparatus 100 plays back the sound of advertising content distributed as an in-feed advertisement in the determined playback mode. Accordingly, even if the user views articles based on the premise that the user does not listen to the sound, it is possible to prevent the playback of the sound in an inappropriate mode.

The terminal apparatus 100 is useful also when accepting the distribution of advertising content, video content, and the like in a state where the user is supposed to listen to sound, such as a distribution site of moving images posted by users, and a distribution site that distributes a pay or free video content and the like.

Moreover, the terminal apparatus 100 determines the playback mode of gradually increasing sound at the playback of content, in other words, the playback mode of fading in. As a result, the terminal apparatus 100 can prevent the output of sound in such a manner as that the sound of the content is output suddenly in a situation unintended by the user. Moreover, the terminal apparatus 100 can provide the user with an opportunity to change the volume before the sound is output at a predetermined volume level. As a result, the terminal apparatus 100 can prevent the playback of the sound in an inappropriate mode.

Moreover, when content includes a plurality of sounds, the terminal apparatus 100 determines a playback mode of each sound depending on the type of the sound. Hence, the terminal apparatus 100 can play back the sounds included in the content in their respective appropriate modes.

For example, when the type of sound included in the content is a sound logo, the terminal apparatus 100 determines the playback mode of playing back at a predetermined volume level. Hence, the terminal apparatus 100 can let the user try to listen to the sound logo included in the content.

Moreover, when the type of sound included in the content is background sound, the terminal apparatus 100 determines the playback mode of playing back at a predetermined volume level. Here, the background sound is considered to be a sound that does not make surrounding people aware of the background sound much as compared to sound logos and narrations. As a result, the terminal apparatus 100 can provide the user with an opportunity to change the volume while preventing the playback of the sound in an inappropriate mode.

Moreover, when the sound included in the content is a narration, the terminal apparatus 100 determines the playback mode of gradually increasing the volume. Here, a narration by a human or machine-synthesized voice is considered to be sound that easily makes surrounding people aware of the narration. As a result, the terminal apparatus 100 can prevent the playback of the sound in an inappropriate mode.

Moreover, when the playback of the content is paused, the terminal apparatus 100 determines a new playback mode for the time the playback of the content will be resumed, in accordance with the time played before the pause. Hence, for example, when the user pauses the playback of the content in haste due to the output of the sound and subsequently plays back the content again, the terminal apparatus 100 can prevent the playback of the sound in an inappropriate mode.

Moreover, the terminal apparatus 100 determines a playback mode of sound included in content in accordance with the type of content. Hence, the terminal apparatus 100 can play back the sound included in the content more appropriately without damaging the user's impression.

Moreover, the terminal apparatus 100 determines a playback mode of sound included in content in accordance with the physical state of the terminal apparatus 100. Hence, the terminal apparatus 100 can determine a playback mode in accordance with the state of the terminal apparatus 100 and accordingly can play back the sound included in the content more appropriately without damaging the user's impression.

Moreover, the terminal apparatus 100 determines a playback mode of sound included in content in accordance with the settings of other terminal apparatuses existing in the surroundings. Hence, the terminal apparatus 100 outputs the sound in a mode in agreement with the surrounding situation, and accordingly can play back the sound included in the content without damaging the user's impression.

Moreover, the terminal apparatus 100 determines a playback mode of sound included in content in accordance with the use history of the function of the terminal apparatus 100. Hence, the terminal apparatus 100 can prevent the output of the sound in an inappropriate mode.

Moreover, the terminal apparatus 100 determines a playback mode of sound included in content in accordance with the playback mode of when the terminal apparatus 100 played back sound within a predetermined period of time. Hence, the terminal apparatus 100 outputs the sound of the content in accordance with the mode of when the sound was previously played back, and accordingly can play back the sound included in the content without damaging the user's impression.

Moreover, the terminal apparatus 100 determines a playback mode of sound in accordance with the position of content with respect to the display screen. Hence, the terminal apparatus 100 can change the volume in accordance with, for example, the user's scroll operation, and accordingly can impress the user with the content and, provide the user with an opportunity to change the volume setting.

Moreover, when content that started being played back in a state of not being displayed on the display screen has moved to a predetermined position of the display screen by the user's operation, the terminal apparatus 100 plays back the content again from the beginning. Hence, the terminal apparatus 100 can let the user view the content from the beginning.

Moreover, when a playback mode of sound included in content is different from the mode of outputting sound at a preset volume level, the terminal apparatus 100 displays the attention display. Hence, the terminal apparatus 100 can provide the user with an opportunity to change the volume setting while notifying the user of the output of the sound.

Moreover, when the user has selected the attention display, the terminal apparatus 100 changes a playback mode of sound included in content to a predetermined playback mode. Hence, the terminal apparatus 100 can easily change the volume setting and also prevent the output of the sound in an inappropriate mode.

Moreover, when the user performs a volume operation while content is being played back in a determined playback mode, the terminal apparatus 100 change the volume in accordance with the operation. Hence, the terminal apparatus 100 can easily change the volume setting and also prevent the output of sound in an inappropriate mode.

Up to this point, some embodiments of the present application have been described in detail with reference to the drawings. However, they are simply illustrated by example. The present invention can be carried out in other modes where various modifications and improvements are made based on the knowledge of those skilled in the art, including the modes described in the field of the disclosure of the invention.

Moreover, the above "unit (section, module, unit)" can be read as "means", "circuit", and the like. For example, the distribution unit can be read as distribution means and a distribution circuit.

An aspect of an embodiment has an effect that can prevent the playback of sound in an inappropriate mode.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a speaker; and
at least one processor configured to:
  upon receiving a web page or web content when no sound is played from the speaker, automatically: (i) determine whether the web page or web content has sound-producing web content, and (ii) when the web page or web content has sound-producing web content, determine a playback mode that gradually increases volume of sound included in the sound-producing web content;
  play back the sound included in the sound-producing web content in the determined playback mode;
  when playing back the sound included in the sound-producing web content, control the speaker to play back the sound included in the sound-producing web content in the determined playback mode so as to gradually increase the volume of the sound included in the sound-producing web content; and
  upon the playback of the sound-producing web content being paused, determine a new playback mode for a time that the playback of the sound-producing web content is resumed, in accordance with an amount of time played before the pause.

2. The information processing apparatus according to claim 1, wherein the at least one processor is further configured to: when the web page or web content includes a plurality of sounds, determine a playback mode of each sound of the plurality of sounds in accordance with the type of the respective sound.

3. The information processing apparatus according to claim 2, wherein the at least one processor is further configured to: when the type of the respective sound is a sound logo, determine, as the playback mode, a mode of playing back the sound logo at a predetermined volume level.

4. The information processing apparatus according to claim 2, wherein the at least one processor is further configured to: when the type of the respective sound is background sound, determine, as the playback mode, a mode of playing back the background sound at a predetermined volume level.

5. The information processing apparatus according to claim 2, wherein the at least one processor is further configured to: when the type of the respective sound is a narration, determine, as the playback mode, a mode of gradually increasing the volume of the narration.

6. The information processing apparatus according to claim 1, wherein the at least one processor is further configured to: determine the playback mode of the sound included in the sound-producing web content in accordance with a type of the web page or web content.

7. The information processing apparatus according to claim 1, wherein the at least one processor is further configured to: determine the playback mode of the sound included in the sound-producing web content in accordance with a physical state of the information processing apparatus.

8. The information processing apparatus according to claim 1, wherein the at least one processor is further configured to: determine the playback mode of the sound included in the sound-producing web content in accordance with a setting of another information processing apparatus that exists around the information processing apparatus.

9. The information processing apparatus according to claim 1, wherein the at least one processor is further configured to: determine the playback mode of the sound included in the sound-producing web content in accordance with a use history of a function of the information processing apparatus.

10. The information processing apparatus according to claim 1, wherein the at least one processor is further configured to: determine the playback mode of the sound included in the web sound-producing content in accordance with a playback mode of when the information processing apparatus played back sound within a predetermined period of time.

11. The information processing apparatus according to claim 1, wherein the at least one processor is further configured to: determine the playback mode of the sound included in the sound-producing web content in accordance with a position of the sound-producing web content with respect to a display screen of the information processing apparatus.

12. The information processing apparatus according to claim 11, wherein the at least one processor is further configured to: when the sound-producing web content started being played back in a state of not being displayed on the display screen of the information processing apparatus and has moved by a user's operation to a predetermined position on the display screen, control the speaker to play back the sound-producing web content again from the beginning.

13. The information processing apparatus according to claim 1, further comprising a display, wherein the at least one processor is further configured to control the display to display information indicating that the playback mode of the sound was changed, when the playback mode of the sound included in the sound-producing web content is different from a mode of outputting sound at a preset volume level.

14. The information processing apparatus according to claim 13, wherein the at least one processor is further configured to: when the user has selected the information indicating that the playback mode of the sound was changed, change the playback mode of the sound included in the sound-producing web content to a predetermined playback mode.

15. The information processing apparatus according to claim 1, wherein the at least one processor is further configured to: when the user performs a volume operation while the sound-producing web content is being played back in the determined playback mode, change the volume in accordance with the user's operation.

16. An information processing apparatus comprising:
at least one processor configured to:
  determine a playback mode of sound included in received content; and
  play back the sound included in the received content in the determined playback mode, at playback of the content, wherein the processor is further configured to: upon the playback of the content being paused, determine a new playback mode for a time that the playback of the content is resumed, in accordance with an amount of time played before the pause.

17. A distribution apparatus comprising:
a network communication interface; and
at least one processor configured to:
  distribute, over a network via the network communication interface, control information to an information processing apparatus for playing back content including sound, wherein the control information causes the information processing apparatus to:
  upon receiving a web page or web content when no sound is played from the speaker, automatically: (i) determine whether the web page or web content has sound-producing web content, and (ii) when the web page or web content has sound-producing web content, determine a playback mode that gradually increases volume of the sound included in the sound-producing web content,
  play back the sound included in the sound-producing web content in the determined playback mode,
  when playing back the sound included in the sound-producing web content, control a speaker to play back the sound included in the sound-producing web content in the determined playback mode so as to gradually increase the volume of the sound included in the sound-producing web content, and
  upon the playback of the sound-producing web content being paused, determine a new playback mode for a time that the playback of the sound-producing web content is resumed, in accordance with an amount of time played before the pause.

18. A playback method comprising:
upon receiving, by an information processing apparatus, a web page or web content when no sound is played from the speaker, automatically: (i) determining, by the information processing apparatus, whether the web page or web content has sound-producing web content, and (ii) when the web page or web content has sound-producing web content, determining, by the information processing apparatus, a playback mode that gradually increases volume of sound included in the sound-producing web content;
playing back the sound included in the sound-producing web content in the determined playback mode;
when playing back the sound included in the sound-producing web content, controlling, by the information processing apparatus, a speaker of the information processing apparatus to play back the sound included in the sound-producing web content in the determined playback mode so as to gradually increase the volume of the sound included in the sound-producing web content; and
upon the playback of the sound-producing web content being paused, determining a new playback mode for a time that the playback of the sound-producing web content is resumed, in accordance with an amount of time played before the pause.

19. A non-transitory computer readable storage medium having stored therein a playback program comprising executable instructions that, when executed by at least one processor, cause the at least one processor to:
  upon receiving a web page or web content when no sound is played from the speaker, automatically: (i) determine whether the web page or web content has sound-producing web content, and (ii) when the web page or web content has sound-producing web content, determine a playback mode that gradually increases volume of sound included in the sound-producing web content;
  play back the sound included in the sound-producing web content in the determined playback mode;
  when playing back the sound included in the sound-producing web content, control a speaker to play back the sound included in the sound-producing web content in the determined playback mode so as to gradually increase the volume of the sound included in the sound-producing web content; and
  upon the playback of the sound-producing web content being paused, determine a new playback mode for a time that the playback of the sound-producing web content is resumed, in accordance with an amount of time played before the pause.

20. A playback method comprising:
determining a playback mode of sound included in received content; and playing back the sound included in the received content in the determined playback mode, at playback of the content, wherein a processor is further configured to: upon the playback of the content being paused, determine a new playback mode for a time that the playback of the content is resumed, in accordance with an amount of time played before the pause.

21. A non-transitory computer readable storage medium having stored therein a playback program comprising executable instructions that, when executed by at least one processor, cause the at least one processor to:
  determine a playback mode of sound included in received content; and
  play back the sound included in the received content in the determined playback mode, at playback of the content, wherein the processor is further configured to: upon the playback of the content being paused, determine a new playback mode for a time that the playback of the content is resumed, in accordance with an amount of time played before the pause.

* * * * *